US010906752B2

(12) United States Patent
Schopp et al.

(10) Patent No.: US 10,906,752 B2
(45) Date of Patent: Feb. 2, 2021

(54) TRANSPORT STAR-WHEEL FOR GUIDING CONTAINERS IN A CONTAINER HANDLING FACILITY

(71) Applicants: Matthias Schopp, Celle (DE); Alberto Garcia, Toluca (MX)

(72) Inventors: Matthias Schopp, Celle (DE); Alberto Garcia, Toluca (MX)

(73) Assignee: KHS AG, Dortmund (DE)

( * ) Notice: Subject to any disclaimer, the term of this patent is extended or adjusted under 35 U.S.C. 154(b) by 0 days.

(21) Appl. No.: 16/053,391

(22) Filed: Aug. 2, 2018

(65) Prior Publication Data

US 2019/0135554 A1  May 9, 2019

Related U.S. Application Data

(63) Continuation-in-part of application No. PCT/EP2017/052340, filed on Feb. 3, 2017.

(30) Foreign Application Priority Data

Feb. 4, 2016  (DE) .......................... 10 2016 101 985

(51) Int. Cl.
*B65G 29/00* (2006.01)
*B65G 47/84* (2006.01)

(52) U.S. Cl.
CPC .......... *B65G 47/846* (2013.01); *B65G 29/00* (2013.01)

(58) Field of Classification Search
CPC .............................. B65G 29/00; B65G 47/846
USPC ................. 198/867.11, 803.3, 803.9, 803.14
See application file for complete search history.

(56) References Cited

U.S. PATENT DOCUMENTS

| | | | | |
|---|---|---|---|---|
| 5,257,888 A * | 11/1993 | Kronseder | ........... | B65G 47/904 294/65 |
| 5,581,975 A * | 12/1996 | Trebbi | ................. | B65G 47/847 53/282 |
| 5,607,045 A * | 3/1997 | Hermann Kronseder | ................... | B08B 9/42 198/476.1 |
| 5,927,473 A * | 7/1999 | Draghetti | ................ | B65B 35/26 198/474.1 |
| 6,508,498 B1 * | 1/2003 | Spether | ..................... | B65C 9/04 198/803.14 |
| 6,692,050 B2 * | 2/2004 | Graffin | ................... | B65G 29/00 198/803.7 |
| 6,719,031 B2 * | 4/2004 | Sawai | ................ | A61F 13/0279 156/519 |
| 7,275,633 B2 * | 10/2007 | Zimmermann | ........... | B07C 1/18 198/474.1 |
| 7,681,713 B2 * | 3/2010 | Nishi | ..................... | B65G 29/00 198/469.1 |
| 7,748,518 B2 * | 7/2010 | Hollriegl | .............. | B65G 47/842 198/469.1 |

(Continued)

FOREIGN PATENT DOCUMENTS

DE   14 82 616   1/1969
DE   30 40 096   5/1982

(Continued)

OTHER PUBLICATIONS

U.S. 2019/0084776 A1, Fahldieck et al., Mar. 21 (Year: 2019).*

*Primary Examiner* — Douglas A Hess

(57) ABSTRACT

Transport star-wheel arrangement for handling containers that utilizes star-wheel pockets and linear devices to adjust the star-wheel pockets in both the radial direction and a vertical direction.

16 Claims, 11 Drawing Sheets

(56) References Cited

U.S. PATENT DOCUMENTS

| | | | | |
|---|---|---|---|---|
| 8,104,603 B2* | 1/2012 | Martinelli | ............ | B65G 47/847 |
| | | | | 198/459.2 |
| 8,202,079 B2* | 6/2012 | Litzenberg | ............. | B65G 29/00 |
| | | | | 198/468.3 |
| 8,813,951 B2* | 8/2014 | Forsthoevel | ............ | B29C 49/36 |
| | | | | 198/406 |
| 9,027,736 B2* | 5/2015 | Lanfranchi | .......... | B65G 47/848 |
| | | | | 198/377.04 |
| 9,045,284 B2* | 6/2015 | Turlotte | ................. | B65G 43/02 |
| 9,463,591 B2* | 10/2016 | Winzinger | .......... | B29C 49/4205 |
| 9,567,165 B2* | 2/2017 | Clusserath | ............ | B65G 29/00 |

FOREIGN PATENT DOCUMENTS

| | | |
|---|---|---|
| DE | 100 50 084 | 8/2001 |
| DE | 103 52 885 | 7/2005 |
| DE | 10 2011 010 954 | 8/2012 |
| DE | 10 2012 106 263 | 1/2014 |
| DE | 10 2013 105 431 | 11/2014 |
| DE | 10 2013 106 084 | 12/2014 |
| GB | 2 075 943 | 11/1981 |

* cited by examiner

TRANSPORT STAR-WHEEL FOR GUIDING CONTAINERS IN A CONTAINER HANDLING FACILITY

CONTINUING APPLICATION DATA

This application is a Continuation-In-Part application of International Patent Application No. PCT/EP2017/052340, filed on Feb. 3, 2017, which claims priority from Federal Republic of Germany Patent Application No. DE 10 2016 101 985.2, filed on Feb. 4, 2016. International Patent Application No. PCT/EP2017/052340 was pending as of the filing date of this application. The United States was an elected state in International Patent Application No. PCT/EP2017/052340.

BACKGROUND

1. Technical Field

The present application relates to a transport star-wheel for guiding containers in a container handling facility.

1. Background Information

Background information is for informational purposes only and does not necessarily admit that subsequently mentioned information and publications are prior art.

The present application relates to a transport star-wheel for guiding containers in a container handling facility. Format parts, such as transport star-wheels, are used in container handling facilities in order to hold and guide the containers as they pass through the facility along a transport path. In this situation transport star-wheels are used, for example in the region of liquid filling, labeling, or closing machines.

The format parts are usually matched to a generic type of container or limited container sizes, with the result that, in the event of a change of container, the format parts must generally also be exchanged. In order to minimize the elaborate changing of transport star-wheels, transport systems are known which exhibit star pockets which are adjustable in their size, such that a transport star-wheel can hold containers with different diameters and guide them through the container facility.

With regard to transport star-wheels, a distinction is made between two different generic types. On the one hand, there are transport star-wheels with container grippers or container clamps for the desired location fixing of the container to the transport star-wheel, and, on the other, transport star-wheels with pockets, into which the containers run and in which the containers are guided during the rotational movement of the transport star-wheel. Transport star-wheels with pockets usually comprise an external guide device, with which the containers are in contact and on which the containers are pushed along by the rotating transport star-wheel.

In some examples of an adjustable transport star-wheel with pockets, the change of size of the pockets frequently takes place by means of a rotational movement of individual star-wheels. In addition to this, transport star-wheels are also known with which, by means of the rotational movement of the star-wheels, the contact regions of the pockets are moved radially.

In other examples of a transport star-wheel with size-adjustable pockets, a contact section of the container pocket can be adjusted in the radial and vertical directions by means of a jointed arm system. As an alternative to the jointed arm system, the transport star-wheel can also exhibit a flexible membrane for contacting the containers. Other examples of a transport star-wheel with container pockets can exhibit pocket shells which are adjustable in the radial direction, by means of which a soft elastic material is brought into contact with the containers. The known transport star-wheels comprise a mechanical adjustment arrangement in order to allow for a simultaneous and uniform adjustment of the size of the pockets. The mechanics of the adjustment arrangement are extremely elaborate in their structure, expensive, and sensitive to damage. As well as this, the elaborate mechanics make it substantially more difficult to keep the transport star-wheels clean, with the result, for example, that the high demands for hygiene during the transport of containers for foodstuffs may be achieved with difficulty.

As well as the different diameters of the containers, there is also a problem with regard to different container heights, since the optimum contact point of the pocket on the container is at different heights. In order to adjust the working height of the transport star-wheel in the handling facility, usually the transport star-wheels and, if appropriate, the external guide, are exchanged. As an alternative, but also very elaborate, the transport star-wheels can be arranged such as to be movable in their working height as a whole in the handling facility. So, some vertically adjustable container support devices are known.

OBJECT OR OBJECTS

The present application is therefore based on an object of providing an adjustable transport star-wheel for guiding containers of different dimensions, which is cost-effective, easy to adjust, and easy to clean.

SUMMARY

This object may be achieved by at least one of the exemplifications of a transport star-wheel arrangement, configured to guide containers in a container handling facility comprising a star-wheel, with a plurality of star-wheel pockets, each pocket configured to accommodate a container, and an adjustment device comprising a plurality of linear units arranged in a radial direction from a star wheel axis of rotation, disclosed herein. Possible variants of the present application are described herein.

At least one additional possible of the transport star-wheel of the present application is described herein. In this context, the features described are in principle an object of the present application, taken alone or in any desired combination, regardless of their association in the claims or reference to them.

According to the present application, the transport star-wheel for guiding containers in a container handling facility comprises a star-wheel with a plurality of pockets for accommodating in each case one of the containers, and an adjustment device with linear units for moving the pockets, a coupling unit connecting the linear units and the pockets, and a guide device for guiding the star-wheel pockets in the radial and vertical directions.

According to the present application, the transport star-wheel therefore allows for the transport of different containers with different diameters and with different optimum contact points of the pocket with the container in height, starting from the container base.

Generic transport star-wheels are understood to be adjustable transport star-wheels which comprise star-wheel pockets to accommodate containers. That is to say, the transport star-wheels comprise components at the outer circumference of a star-wheel which form the star-wheel pockets and into which the containers can be brought in contact. The generic transport star-wheels do not comprise any container clamps/ container grippers, with which a firm enclosure of the containers is carried out. The star-wheel pockets are therefore configured as non-gripping container receivers. The transport star-wheel also does not comprise any coaxially adjustable star-wheels in order to move the star-wheel pockets radially and/or vertically.

The generic transport star-wheels can interact with an external guide of the container handling facility, such that the containers are held in the star-wheel pocket between the external guide and the contact surfaces, and are pushed along at the external guide.

The transport star-wheels are configured in one possible exemplification for containers, such as, for example, bottles or cans. In this situation, the containers can be provided for liquids, such as beverages. The transport star-wheels are used in one possible exemplification in container handling facilities with corresponding container filling stations, labeling stations, and/or also closing stations. Corresponding maintenance and inspection devices can also be provided in the container handling facility through which the containers are guided with the aid of the transport star-wheels. In this situation, the transport star-wheels are used, for example, in the region of the transport paths between the individual stations of the container handling facility.

A star-wheel is understood to mean a component of a transport star-wheel which comprises at its outer circumference the star-wheel pockets in which to lay the containers, wherein in each case a star-wheel pocket is provided and configured so as to accommodate a container. The star-wheel pockets can, for example, be configured as expanded regions in the external region of the star-wheel, or also as components arranged at the star-wheel (in the region of the outer circumference) which form a star-wheel pocket. The star-wheel pockets can therefore be configured in a v-shape (in fork fashion), and comprise star-wheel pocket arms, arranged, for example at an angle to one another. The star-wheel pockets can also be configured as bow-shaped, such as u-shaped or half-oval in shape.

A star-wheel comprises a plurality of individual star-wheel pockets, which are arranged next to one another in the region of the outer circumference of the star-wheel. The number of star-wheel pockets is dependent on the star-wheel diameter or the container diameter. A plurality in the meaning of the present application is understood to be at least the number of two star-wheel pockets or linear units, for example.

As already mentioned, the star-wheels do not comprise any gripping or clamping elements for gripping or encompassing a container. That is to say, the container comes in contact with the star-wheel pocket, is received in it, and, if appropriate, pressed into it by a corresponding external pressure. The star-wheel pocket flanks or arms, i.e. the components of the star-wheel pocket which surround the contact surfaces, cannot be moved towards or apart from one another during the operation of the transport star-wheel, in the manner of a container gripper (container clamp). The star-wheel pocket flanks are, in one possible exemplification, arranged as rigid, immovable, or in a fixed position in relation to one another. Accordingly, no active acquisition takes place by means of the star-wheel pocket, but, in any event, a light pressing pressure is produced for the containers onto the contact surfaces in the star-wheel pocket.

An adjustment device in this situation is understood to be a device by means of which the star-wheel pockets can be moved backwards and forwards between at least two radial positions and between at least two vertical positions. The radial direction relates in this situation to the direction between the axis of rotation and the outer side of the star-wheel, while the vertical movement relates to the longitudinal axis direction of the rotation axis of the star-wheel.

The adjustment device comprises a plurality of linear units. Generally favorable for the positioning precision of the star-wheel pockets in this situation is a ratio between the number of star-wheel pockets and the number of linear units of 1:1 or 2:1.

The coupling unit, likewise encompassed by the adjustment device, is understood to be a connection between at least one linear unit and a star-wheel pocket, by means of which a movement of the linear unit is transferred onto the star-wheel pocket. The radial and vertical movement direction of the star-wheel pocket is steered by means of the guide unit. Accordingly, the guide unit is understood to be a device which steers a movement of the star-wheel pockets in the radial and vertical directions.

The coupling unit can be formed between an individual linear unit and an individual star-wheel pocket, or, alternatively, between a linear unit and a plurality of star-wheel pockets, for example two star-wheel pockets. The coupling unit can also comprise a plurality of part coupling elements, which in each case, for example, connect a linear unit to one or more star-wheel pocket. In one possible exemplification, the coupling unit can also connect virtually all or most of the linear units to virtually all or most of the star-wheel pockets, as a result of which an essentially good and uniform distribution can be achieved of the force from the linear units taking effect on the star-wheel pockets, and therefore a desired movement of the star-wheel pockets can be attained. Likewise, in the event of a counter-pressure of a container on an individual star-wheel pocket, the force transferred by the container onto the star-wheel pocket is distributed by means of the coupling unit onto virtually all or most of the connected linear units, as a result of which, also with the transport star-wheel in operation, the position of the star-wheel pockets remains retained in a desired position.

In one possible exemplification, the coupling unit can be a screw connection or a plug-in connection, which, for example, connects a second end of the linear unit, directed radially outwards, to the star-wheel pocket. For the coupling of one linear unit to a plurality of star-wheel pockets, for example two, which are connected by a first end to a second end of the linear unit, and by a second end to the star-wheel pocket.

The radial and vertical adjustment of the star-wheel pockets is carried out at a container change. Accordingly, in the non-rotating state of the star-wheels, the star-wheel pockets are moved in the radial and vertical direction into their predetermined position by means of the adjustment device. In this situation, the movement of the star-wheel pockets takes place, for example, at least as far as possible simultaneously or substantially simultaneously and by the same movement dimension. That is to say, the star-wheel pockets of a star-wheel can be moved in synchrony or substantially synchronously by means of the adjustment device into a same end position.

The linear units and the guide unit in this situation also allow in one possible exemplification for a stepless adjustment capability, with the result that the transport star-wheels may be used with a desired range of flexibility for a large number of different container sizes, in one possible exemplification, different container heights and container diameters. That is to say, the adjustment device is also, in one possible exemplification, configured in such a way that the star-wheel pocket may adopt, as well as the end positions as operating positions, also any possible position between the end positions as the operating position.

In order to minimize unwanted movement of the star-wheel pockets out of a predetermined operating position, the adjustment device, in one possible exemplification, also comprises a fixing unit, which fixes the star-wheel pocket in the adjusted position. The fixing unit can be configured, for example, as a clamp or follower device. It is also possible, for example, for a guide curve to comprise corresponding follower elements, into which follower units engage.

The linear units comprised by the adjustment device are arranged in the radial direction. That is to say, the linear units are aligned with their longitudinal axis in the radial direction, such that the direction of effect of the linear units is also radial. Linear units can be understood to be, for example, electric linear motors, electrically-driven linear units (such as spindle drives), mechanically adjustable rods, or piston-cylinder units. Piston-cylinder units can also be provided for pneumatic operation, or configured as mechanically-adjustable piston-cylinder units, but in one possible exemplification of the present application are configured for operation with hydraulic fluid, in order to attain a desired adjustment precision. In this situation, the liquid fluid (hydraulic fluid) generally necessary or desired for the hydraulic linear units is, in one possible exemplification of the present application, sterile water, an aqueous solution, edible oil, or a highly viscous fluid. In one possible exemplification, the liquid fluid can be configured as a liquid fluid which is suitable for foodstuff production.

For a relatively simple structural arrangement, provision is made according to one possible exemplification of the present application for the linear unit to be mounted such that it can pivot with a first end. The mounting is provided in one possible exemplification at the first end of the linear unit facing towards the rotation axis of the transport star-wheel. The mounting can be provided, for example, by means of a bearing axle or a rotary joint. The second end of the linear unit, opposite the first end, can, for example, be connected by means of the coupling unit to the star-wheel pocket.

While the linear unit transfers a movement force by way of the coupling unit onto the star-wheel pocket, the path of the movement, as already indicated, is steered into the radial and vertical direction of the guide unit.

For this purpose, the guide unit comprises, in one possible exemplification, a guide curve in a desired position, arranged in which is a follower unit, connected to the star-wheel pocket. At the transfer of the movement force from the linear unit onto the star-wheel pocket, this moves by means of the follower unit along the guide curve in the vertical and radial direction. The movement of the star-wheel pocket in the radial and vertical direction therefore takes place as a continuous or substantially continuous movement of the star-wheel pocket, and not in the form of combined part movements of different structural bodies, such as, for example, a vertical movement of the transport star-wheel and a radial movement of the star-wheel pockets.

The guide curve is in one possible exemplification configured in a guide element as a slot or groove, in which the follower unit is guided, configured, for example, as a bolt. The follower unit can be arranged with the star-wheel pocket, or at a guide body connected to the star-wheel pocket.

In one possible exemplification, the guide body and the guide element are arranged essentially parallel to one another. The guide body and/or the guide element can also be aligned essentially parallel to the linear unit. For desired guidance and desired positioning of the star-wheel pocket in an operating position (in which the containers are being transported), the star-wheel pocket may comprise two guide bodies arranged spaced apart from one another, which are each mounted by means of a follower unit in a guide curve of a guide element. Accordingly, two guide elements with guide curve can also be allocated to each star-wheel pocket.

An adjustment device for an individual star-wheel pocket can therefore exhibit a mirror-image structural formation. For example, a linear unit arranged centrally or substantially centrally in the radial direction can be arranged between two guide bodies belonging to the star-wheel pocket, which in turn are arranged between two guide elements and aligned essentially parallel to them. The guide body can be connected by a first end, pointing outwards in the radial direction, to the star-wheel pocket. The guide body is configured, for example, in plate form, wherein the plate plane is aligned vertically.

With a coupling unit which couples virtually all or most of the linear units to virtually all or most of the star-wheel pockets, and/or with a ratio of linear units to star-wheel pockets of 1:2 or greater, the coupling unit can comprise coupling arms, which are arranged between the linear unit and a guide device arranged in the region of the star-wheel pocket. In order in this case to allow for both a vertical as well as a radial movement of the star-wheel pockets, the guide device can comprise a guide element with guide slot, in which a follower connected to the coupling arms is guided.

In order to extend the movement possibility of the star-wheel pockets, or to configure the structural form of the transport star-wheel more compactly, provision is made according to one possible exemplification of the present application for the guide curve to be mounted such as to pivot. In this situation, the guide element comprising the guide curve can be mounted, for example, with a first end, aligned in the direction of the rotation axis, to be rotatable about an axis, or can comprise a rotational joint. The alignment of the mounting is arranged such that the guide curve can be pivoted in the vertical direction. For the adjustment and/or fixing of the guide curve in different vertical positions, a locking screw can, for example, be provided.

The movement direction of the star-wheel pockets between the vertical and the radial end positions is dependent on the guide unit, such as the shape of the guide curve. For example, according to one possible exemplification of the present application, the movement of an individual star-wheel pocket in the radial and vertical direction takes place simultaneously or substantially simultaneously, one after another, and/or alternating. That is to say, the movement path of the star-wheel pocket can exhibit simultaneously, or substantially simultaneously, a vertical and a radial component, for example with a guide curve arranged obliquely to the rotation axis of the transport star-wheel. The movement of the star-wheel pocket can be completely or in sections linear, curved, and/or in a stepped manner.

Accordingly, a guide curve can be configured, for example, as completely or in sections linear, curved, and/or in a stepped manner, wherein any combination of these is possible. It therefore follows that the radial and vertical movements of the star-wheel pocket can take place simultaneously, or substantially simultaneously, separately from one another, i.e. one after another, and, if appropriately, also alternating. The form of the movement of the star-wheel pocket, and therefore also, for example, the form of the guide curve is, in one possible exemplification, matched to the different dimensions of the containers being conveyed.

According to one exemplification of the present application, each star-wheel pocket comprises at least two star-wheel pocket arms, arranged rigidly, immovable, or in a fixed position in relation to one another in the operation of the transport star-wheel, for contacting (receiving) one of the containers. The star-wheel pocket arms are configured in such a way that, in the operation of the transport star-wheel, i.e. during the transport of the containers through the transport star-wheel, they do not carry out any clamping or gripping movement for taking up one of the containers. Each star-wheel pocket arm can exhibit a contact area for coming in contact with one of the containers.

As already mentioned, the linear units can be configured as piston-cylinder units, wherein the piston is mounted such as to be movable in the linear direction in the cylinder. According to one exemplification of the present application, the adjustment device comprises, for the drive of the linear units, a drive unit which is coupled to the linear units. The drive unit can be configured, for example, as a toothed wheel drive, which takes effect on a hydraulic fluid reservoir. In one possible exemplification of the present application, however, the drive is configured as a servomotor (such as a servo-spindle) or work cylinder, in one possible exemplification of the present application, as an electric linear motor or hydraulically driven linear unit, for example as a piston-cylinder unit with a pump. By way of the configuration of the drive unit as a servomotor or as a work cylinder, a desired actuation of the linear units is possible, and therefore a desired and possibly easy radial and vertical adjustment of the star-wheel pockets.

In order to generally improve the synchronicity of the adjustment movement of the star-wheel pocket, i.e. in order to attain a movement of the star-wheel pockets which runs generally synchronized and uniformly, according to one possible exemplification of the present application the hydraulic or pneumatic linear units in one possible exemplification of the present application are coupled in series one after another. That is to say, the linear units are connected to one another in such a way that, starting from the drive unit, for example the hydraulic fluid/pneumatic gas flows from one linear unit into the next linear unit. The movement of the linear units or the star-wheel pockets respectively takes place as a result in synchrony, or substantially synchronously, apart from the slight delay due to the flow movement of the hydraulic fluid/pneumatic gas.

According to one possible exemplification of the present application, with the presence of a hydraulic or pneumatic linear unit, the adjustment device comprises a distributor unit coupled to the drive unit and the linear units. The distributor unit actuates the linear units. In this situation, the distributor unit can, in one possible exemplification of the present application, be configured in such a way that it simultaneously or substantially simultaneously actuates each linear unit or at least in each case groups of linear units or, respectively, groups of linear units coupled to one another in series, and introduces the hydraulic fluid/pneumatic gas into the linear units. The distributor unit has the effect of a generally desired movement of virtually all or most of the linear units into the same operating position.

In one possible exemplification of the present application, in this situation the linear units or groups of linear units are arranged in an essentially parallel direction. The distributor unit can be configured as a hydromechanical synchronizing device, which by means of a controlled distribution of a hydraulic fluid/pneumatic gas produces a synchrony or a substantial synchrony of the linear units or linear unit groups. The synchronizing device is in turn actuated by the drive unit.

The drive unit and, as appropriate, the synchronizer device, can be arranged at the star-wheel or the rotating part of the transport star-wheel. In order to generally improve the ease of cleaning and to simplify the structural arrangement of the star-wheel, provision is made according to a further possible exemplification of the present application for the drive unit to be arranged on a structural body of the container handling facility which does not rotate in the rotating operation of the star-wheel, in one possible exemplification of the present application, a star-wheel receiver.

For the relatively simple transfer of forces from the drive unit onto the distributor unit, or directly onto the linear units respectively, provision is made according to a further possible exemplification of the present application of a coupling, which in one possible exemplification of the present application is of a mechanical configuration and is designed such as to transfer the drive force from the drive unit onto the distributor unit or onto the linear units.

According to a further possible exemplification of the present application, a sensor for determining the position of the star-wheel pocket is also provided. The sensor can be configured as a path sensor, which monitors and records the movement of the star-wheel pocket or of the moving component of the linear unit. The sensor can, however, also be configured as a position sensor, which exclusively detects the end position (the operating position, for example) of the star-wheel pocket. The sensor, in one possible exemplification of the present application, in combination with a control unit for the adjustment device, allows for desired positioning of the star-wheel pockets in a predetermined position, and for the monitoring of the position of the star-wheel pockets in the rotating operation of the star-wheel.

According to a further possible exemplification of the present application, the transport star-wheel comprises a second star-wheel, which is arranged above or below the first star-wheel. The second star-wheel is arranged essentially parallel to the first star-wheel, and rotates about the same vertical rotation axis. The star-wheels are arranged in relation to one another in such a way that in each case a star-wheel pocket of the upper star-wheel is arranged directly above a star-wheel pocket of the lower star-wheel, such that in each case a star-wheel pocket of the upper star-wheel and a star-wheel pocket of the lower star-wheel engage jointly on a container.

With a configuration of the transport star-wheel with two star-wheels arranged above one another, the transport star-wheel, in one possible exemplification of the present application, comprises two separate drive devices, such that the linear units of the upper star-wheel can be moved separately from the linear units of the lower star-wheel.

The second star-wheel can be configured corresponding to the first star-wheel, with star-wheel pockets adjustable in the vertical and radial direction. In one possible exemplification of the present application, with the configuration of the upper star-wheel as a star-wheel with star-wheel pockets adjustable in the radial and vertical directions, the lower star-wheel can be configured as a star-wheel with exclusively radially adjustable or, as applicable, non-adjustable star-wheel pockets, since it is often the case that a radial and vertical adjustment of the upper star-wheel pockets is sufficient to essentially ensure or promote the reliable holding of the container.

A further possible exemplification of the present application makes provision for the adjustment device to comprise a central adjustment arrangement, which is configured, for example, in a way analogous to an opening mechanism for an umbrella or a rotary clothesline. For this purpose, the central adjustment arrangement can, for example, be arranged such as to be movable vertically at least in sections and/or arranged centrally, for example in the region of the rotation axis of the transport star-wheel.

The central adjustment arrangement can be connected to the drive unit and the linear units, such that a movement force coming from the drive unit is transferred onto the linear units, as a result of which the star-wheel pockets are moved. The movement direction of the star-wheel pockets can, moreover, be predetermined by the guide device.

The central adjustment arrangement can be configured as a mechanical central adjustment arrangement, for example as a mechanically adjustable rod linkage, guide device, link guide, and/or a mechanically adjustable piston-cylinder unit.

In one possible exemplification of the present application, in order to transfer the movement of the central adjustment arrangement in a relatively simple manner onto the star-wheel pockets, the linear units can likewise be configured as rod linkages, guide devices, and/or link guides, or as mechanical piston-cylinder units (without hydraulic or pneumatic drive means).

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described in greater detail hereinafter by way of a number of exemplifications. The figures show.

DESCRIPTION OF EXEMPLIFICATION OR EXEMPLIFICATIONS

Figure 1:
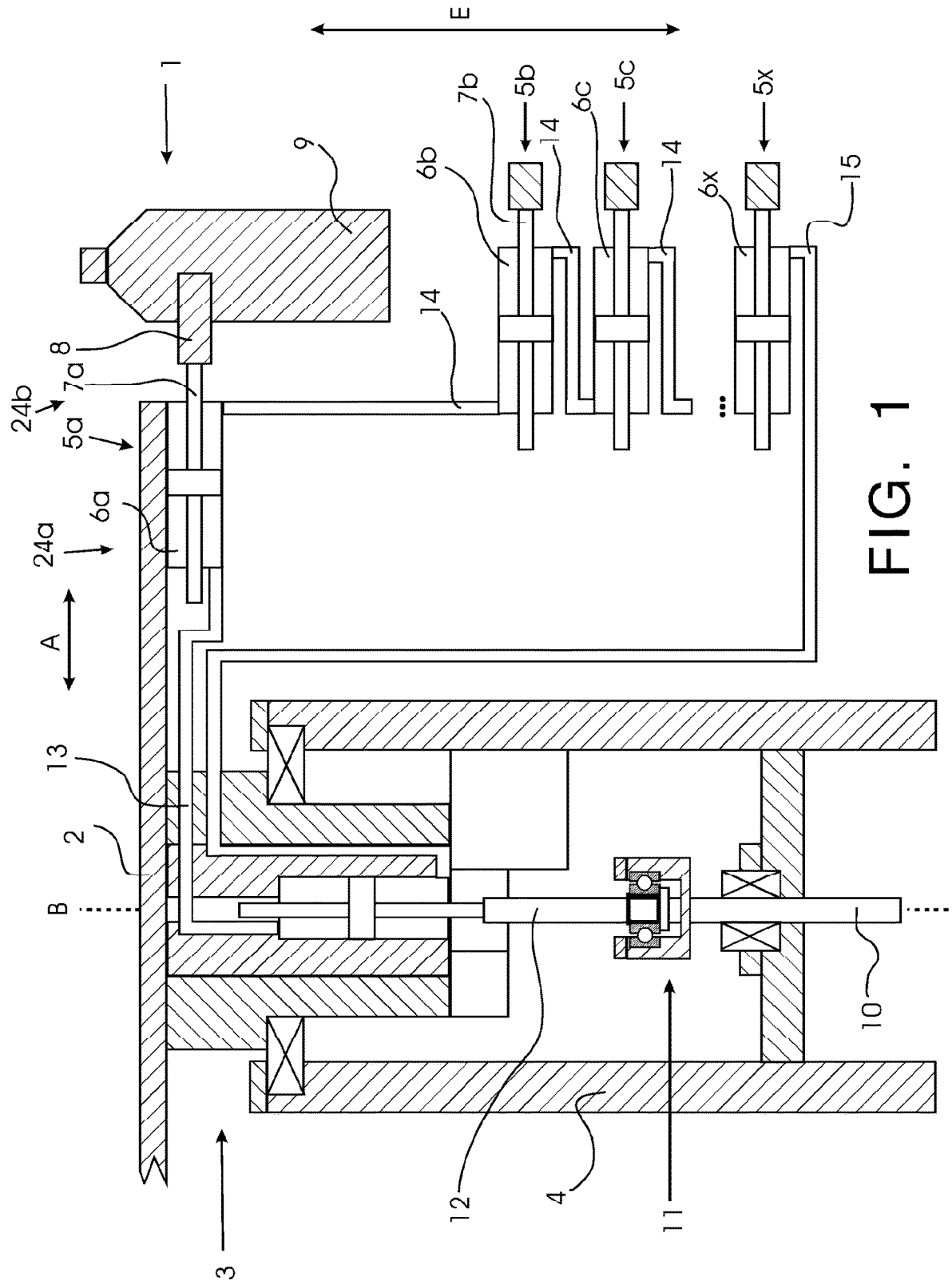
FIG. 1 shows a schematic view in cross-section, a first exemplification of the transport star-wheel according to the present application.

FIG. 1 shows schematically, in cross-section, a section of a transport star-wheel 1 according to the present application. The transport star-wheel 1 comprises a star-wheel 2, which is mounted such as to rotate by means of a rotation bearing 3 at a star-wheel receiver 4. The star-wheel receiver 4 is a part of a container handling facility. The container handling facility is not represented here.

Arranged next to one another at the star-wheel 2 are a plurality of linear units 5*a*-5*x*, extending in the radial direction A (represented by an arrow). The linear units 5*a*-5*x* are configured as double-action hydraulic working cylinders, with a cylinder 6*a*-6*x* and a piston 7*a*-7*x* movable in the cylinder. At a first end 24*a*, pointing towards the rotation axis B of the transport star-wheel 1, the linear units 5*a*-5*x* are mounted such as to be able to pivot about an axis 31 (see FIG. 3). Arranged at a second end 24*b* (free outer end), opposite the first end 24*a*, is a star-wheel pocket 8 for accommodating a container 9. Also arranged is a guide unit 28, not represented here, which, during a movement produced by the linear unit 5*a*-5*x*, steers the star-wheel pocket 8 into a vertical direction E (represented by an arrow) and in the radial direction A.

To produce the movement of the linear units 5*a*-5*x*, a drive unit 10 is connected by means of a mechanical coupling 11 to a distributor unit 12, configured here as a hydraulic cylinder. Coming from the distributor unit 12, a hydraulic fluid line 13 runs into the cylinder 6*a* of a first linear unit 5*a*. The linear units 5*a*-5*x* are connected in series. That is to say, the hydraulic fluid (not represented here) coming from the distributor unit 12 flows into the cylinder 6*a* of the first linear unit 5*a*, as a result of which the piston 7*a* in the cylinder 6*a* is moved radially outwards and vertically downwards. In this situation, the liquid fluid present in the cylinder 6*a* is conveyed via a hydraulic fluid connection line 14 into a cylinder 6*b* of a second linear unit 5*b*. As a result of this, the piston 7*b* of the second linear unit 5*b* is correspondingly moved radially outwards and vertically downwards, and the liquid fluid present in the cylinder 6*b* of the second linear unit 5*b* is conveyed further into the cylinder 6*c* of the next, third linear unit 5*c*. As the hydraulic fluid flows through a hydraulic fluid connection line 13 into the left hand portion of the first linear unit 5*a*, hydraulic fluid is forced out of the right hand portion of the first linear unit 5a into hydraulic fluid connection line 14 and thus into the left hand portion of the second linear unit 5b. If virtually all of the hydraulic units 5a-5x are identical or substantially identical, virtually all of the hydraulic units will advance an identical or substantially identical distance equal to or substantially equal to or proportioned to the movement of the hydraulic unit 5a.

Due to the arrangement of the individual linear units 5a-5x in a series, virtually all of the pistons 7a-7x are to the greatest extent moved simultaneously or substantially simultaneously and by the same path, i.e. synchronously. Starting from the last linear unit 5x, a hydraulic fluid return line 15 conveys the hydraulic fluid back into the distributor unit 12. Due to the guide unit 28, the deflection of the star-wheel pockets 8 occurs both in the radial direction A as well as in the vertical direction E.

In the operation of the star-wheel 2, i.e. when carrying out a rotational movement about its rotation axis B, the mechanical coupling 11 is separated, such that the distributor unit 12 rotates with coupling part of the mechanical coupling 11 which is secured to the distributor unit 12 during the operation of the transport star-wheel 1, while the drive unit 10, with the drive part of the mechanical coupling unit 11 which belongs to the drive unit 10, does not carry out the rotational movement of the star-wheel 2.

Figure 2:
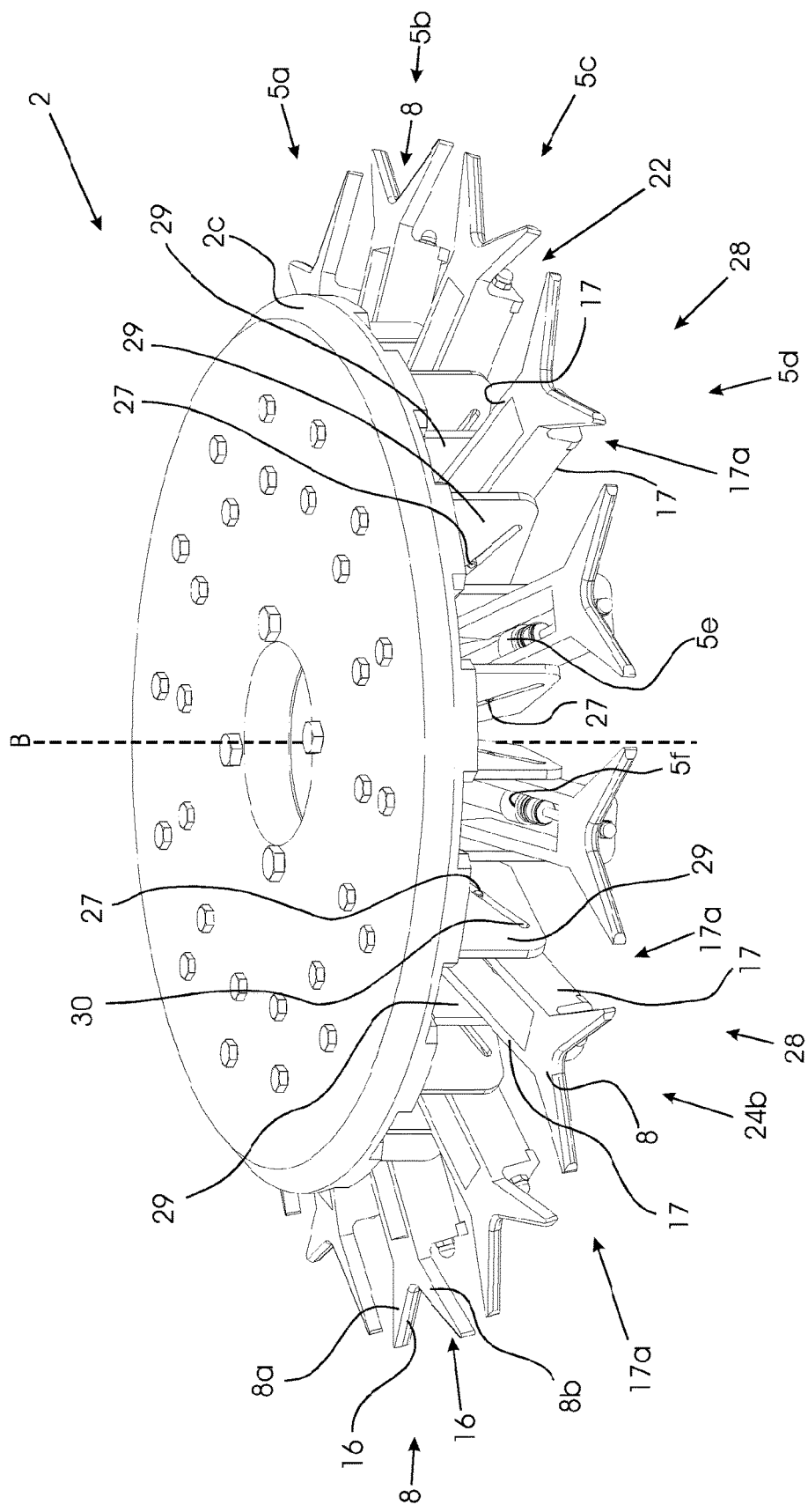
FIG. 2 shows a schematic view, in a perspective representation, the star-wheel from FIG. 1.

FIG. 2 shows in a perspective view an exemplification of the star-wheel 2 represented in FIG. 1 and described heretofore. Arranged in the circumferential direction next to one another are a plurality of star-wheel pockets 8, there being 11 units visible here. Each star-wheel pocket 8 is connected by means of a coupling unit 22 to a hydraulic linear unit 5a-5x, arranged in the radial direction A. The linear units 5a-5x are coupled behind one another in series.

Arranged at each star-wheel pocket 8 are two guide bodies 17 of the guide unit 28, aligned essentially parallel to the linear unit 5, in such a way that each linear unit 5a-5x is positioned between two guide bodies 17. The guide bodies 17 are configured as plate-shaped, aligned perpendicular to or substantially perpendicular to the axis of the star-wheel 2, and connected by their second (outer) ends 17a to the star-wheel pocket 8.

Further, assigned to each star-wheel pocket 8 are two guide elements 29 of the guide unit 28, which in each case are arranged on the outside on the guide bodies 17 and are connected to the star-wheel 2. At the movement of the star-wheel pockets 8 in the vertical and radial directions, the guide bodies 17 slide along at the guide elements 29. As an alternative, the guide elements 29 can also be mounted such as to pivot, for example in the region of the end directed towards the rotation axis B. For this purpose, a locking screw (not represented here) can be arranged here for adjusting (and, for example, fixing) a pivot angle between the guide elements 29 and the star-wheel 2. The locking screw can project through the star-wheel 2, and, for example, be connected to the guide elements 29 in the region of the ends of the guide elements 29 which are pointing outwards.

Arranged in each guide element 29 is a guide curve 30, configured as a slot, in which a follower unit 27 is guided, configured as a bolt and connected to the guide body 17. The guide curve 30 is configured as linear and is arranged obliquely to the rotation axis B. As an alternative or as a combination, the guide curve 30 can also have a curved or other curvilinear shape, such as, a bow-shaped form and/or a stepped form with linear and/or bow-shaped sections.

Figure 2A:
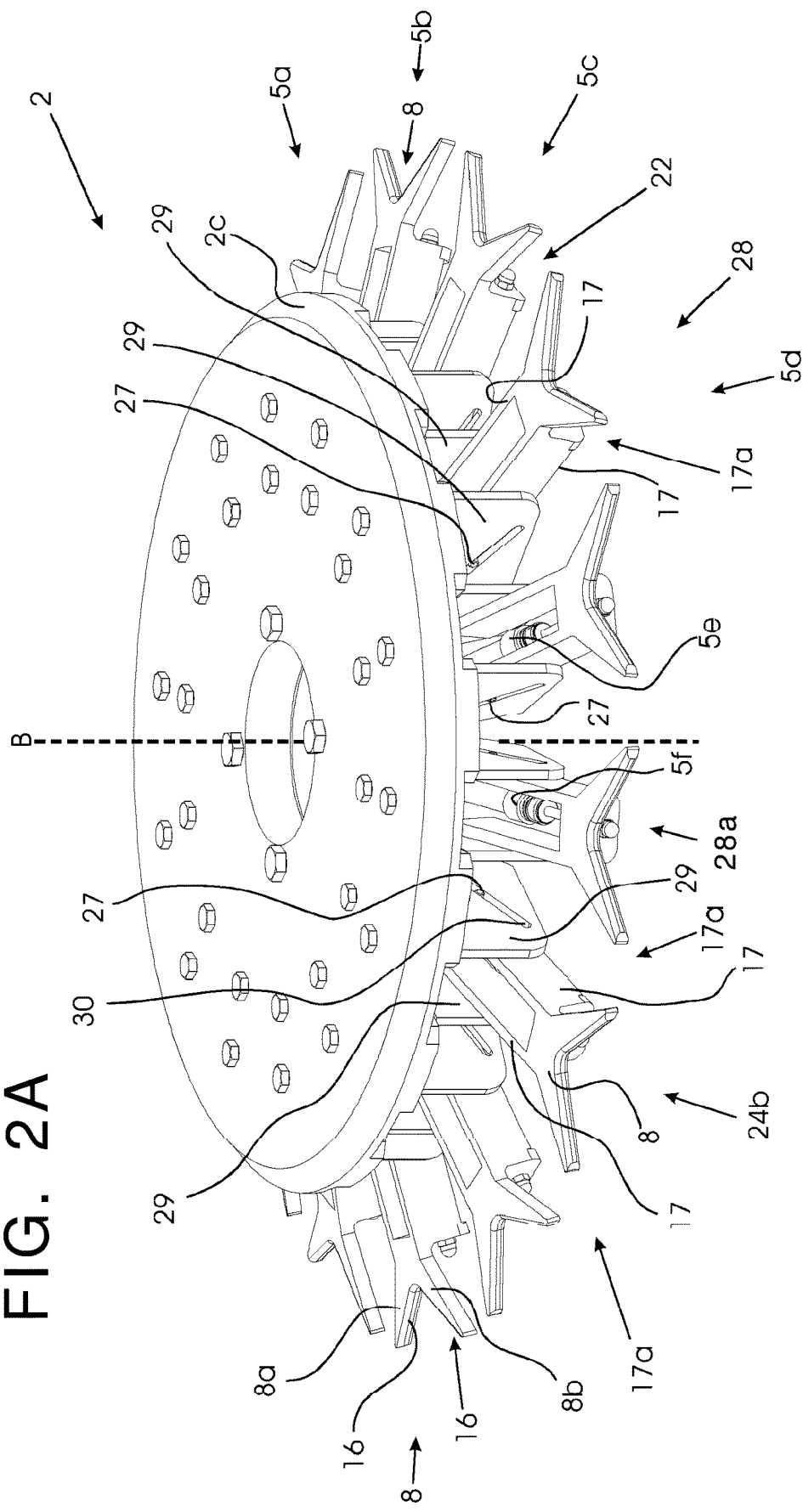
FIG. 2A shows a schematic view, in a perspective representation, the star-wheel from FIG. 1, showing further labeling of the general alignment of a guide unit.

FIG. 2a shows in a perspective view the star-wheel from FIG. 2. The guide unit 28a is shown aligned generally with a linear unit.

Figure 3:
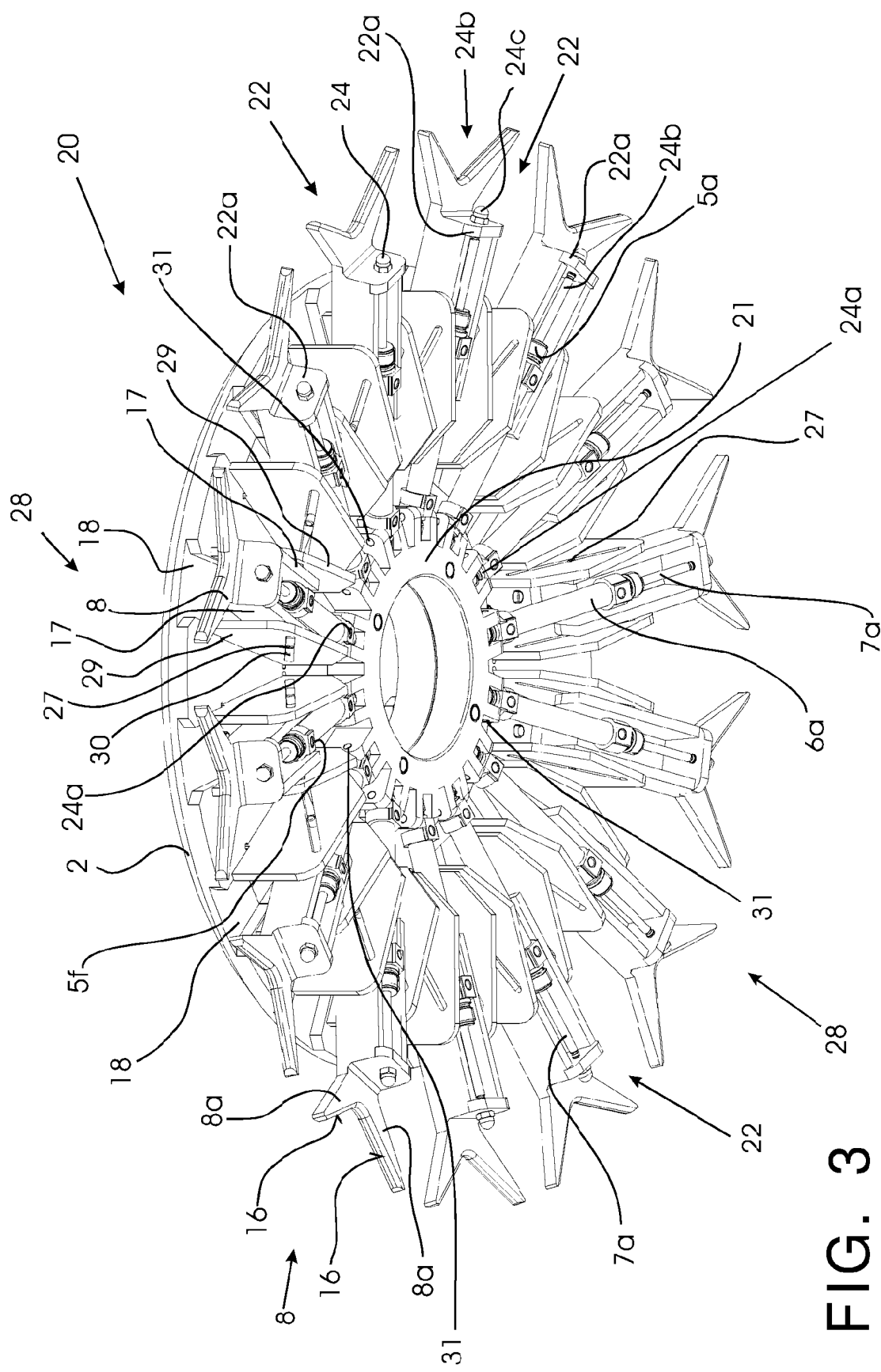
FIG. 3 shows a schematic view, in a perspective representation, an underside of the star-wheel from FIG. 2, with a guide unit for the radial and vertical movement of the star-wheel pockets.
Figure 3A:
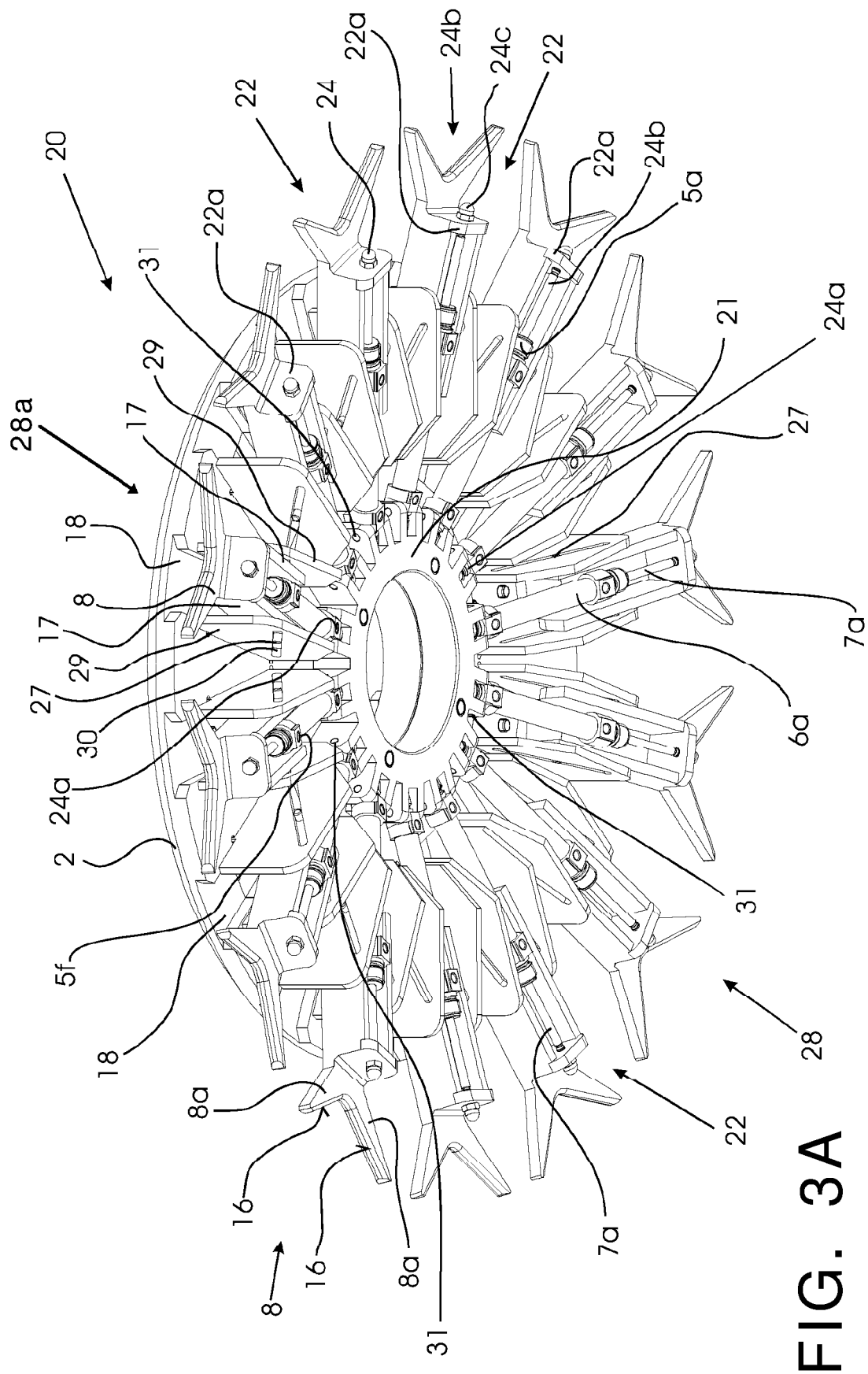
FIG. 3A shows a schematic view, in a perspective representation, an underside of the star-wheel from FIG. 2, with a guide unit for the radial and vertical movement of the star-wheel pockets and shows further labeling of the general alignment of a guide unit.

FIG. 3 shows in a perspective view an underside of the star-wheel 2 from FIG. 2. Clearly visible is the adjustment device 20, with the guide elements 29 aligned perpendicular to or substantially perpendicular to the star-wheel 2, and the guide bodies 17, arranged between the guide elements 29 and connected to the star-wheel pockets 8. As already indicated in relation to FIG. 2, guide curves 30, configured as slots, are provided in the guide elements 29, in which in each case a follower unit 27 is guided, connected to a guide body 17. The guide body 17 and the guide elements 29 are arranged parallel to or essentially parallel to one another and to the linear unit 5a-5x, arranged between the guide bodies 17. The linear units 5a-5x are aligned radially. FIG. 3a shows in a perspective view an underside of the star-wheel from FIG. 3. The guide unit 28a is shown aligned generally with a linear unit Each linear unit 5a-5x is mounted in a central receiver 21, by its first end 24a generally facing towards the rotation axis B, such as to rotate about an axis 31, such that the linear unit 5a-5x follows the vertical movement of the star-wheel pocket 8. As an alternative, a pivot joint can also be arranged.

Each star-wheel pocket 8 is connected by a coupling unit 22 to the star-wheel pocket 8. The coupling unit 22 is formed at the star-wheel pocket 8 by a support element 22a, which is connected to the second end 24b of the linear unit 5a-5x. The connection here is provided in a relatively simple manner by a screw connection 24c of the outer end of one of the pistons 7a (7b-7x are not represented here) to the respective associated support element 22a.

Guide body receivers 18 are also formed in the star-wheel 2, in which the guide bodies 17 are located in a completely inserted position vertically and radially. In order to control the movement of the star-wheel pockets 8, corresponding to the representations in FIG. 1, the linear unit 5 can, for example, be connected in series behind one another.

FIG. 2 and FIG. 3 show the star-wheel pockets 8 in a partially lowered and moved outwards position (operating position), in which the star-wheel pockets 8 are moved downwards in the vertical direction E and outwards in the radial direction A.

Figure 4:
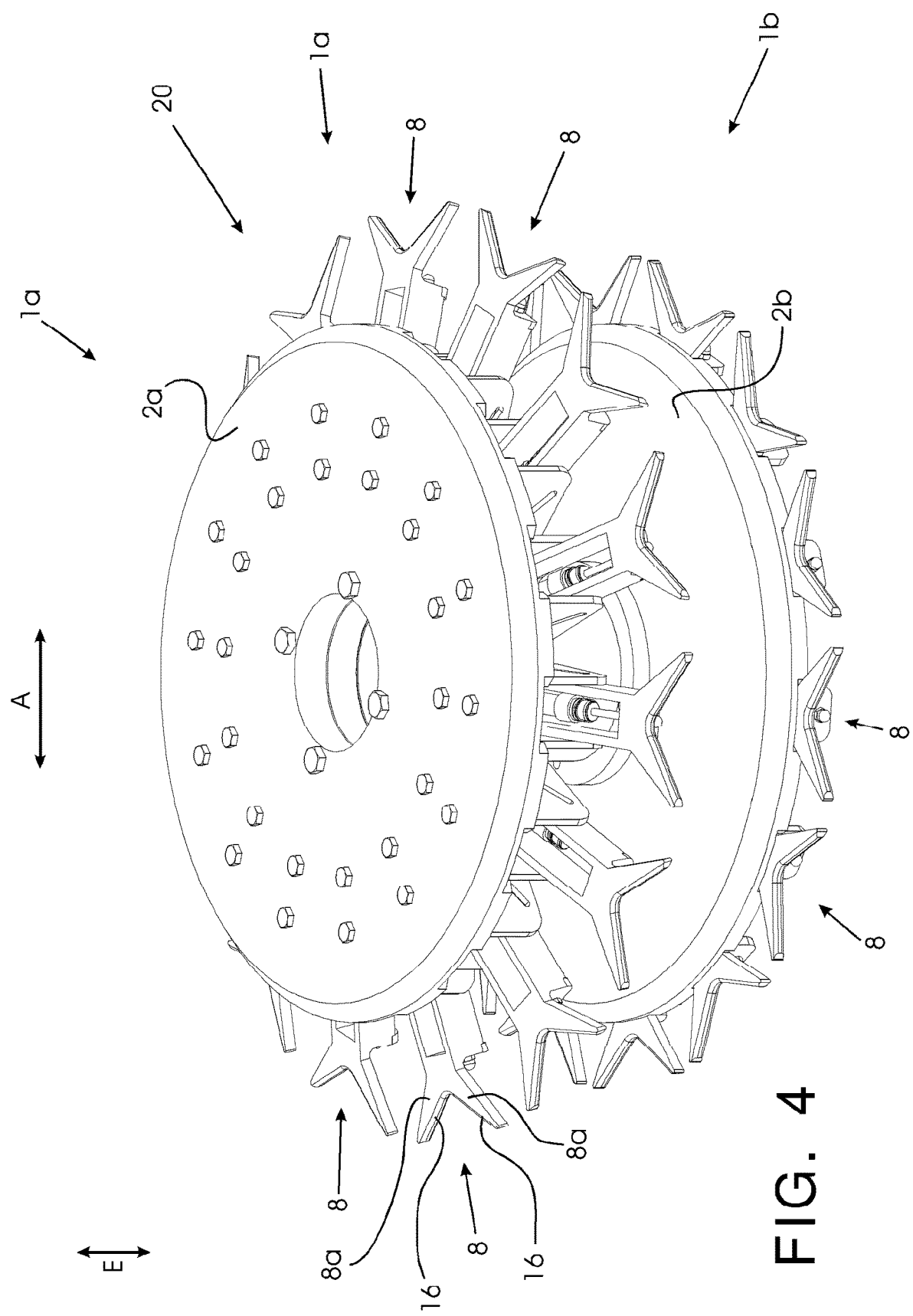
FIG. 4 shows schematically, in a perspective representation, a section from a transport star-wheel with two star-wheels.

FIG. 4 shows, in a schematic representation, a section of a transport star-wheel 1 with two transport star-wheel planes 1a, 1b, an upper transport star-wheel plane 1a and a lower transport star-wheel plane 1b. Each transport star-wheel plane 1a, 1b, comprises a star-wheel 2a, 2b, with star-wheel pockets 8 which can be moved by means of the adjustment device 20. The star-wheel pockets 8 at the star-wheels 2a, 2b, are formed for receiving containers 9, wherein in each case a star-wheel pocket 8 on the upper star-wheel 2a and a star-wheel pocket 8 on the lower star-wheel 2b are arranged above one another, and for receiving an individual container 9 are provided at two different container sections. The star-wheel pockets 8 are formed in a v-shape (fork type) and comprise a contact region 16 at each star-wheel pocket arm 8a.

The star-wheels 2a, 2b, are configured identically to the star-wheel 2 from FIGS. 2 and 3. Each star-wheel 2a, 2b, comprises its own drive unit 10, such that the star-wheel pockets 8 of each star-wheel 2a, 2b, can be moved independently of the star-wheel pockets 8 of the other star-wheel 2a, 2b. In FIG. 4, the star-wheel pockets 8 of the upper (first) star-wheel 2a are already represented in an operating position, moved out in the vertical direction E and radial direction A, while the star-wheel pockets 8 of the second, lower star-wheel 2b are represented in a fully moved-in position, in the radial direction A and vertical direction E.

Figure 5:
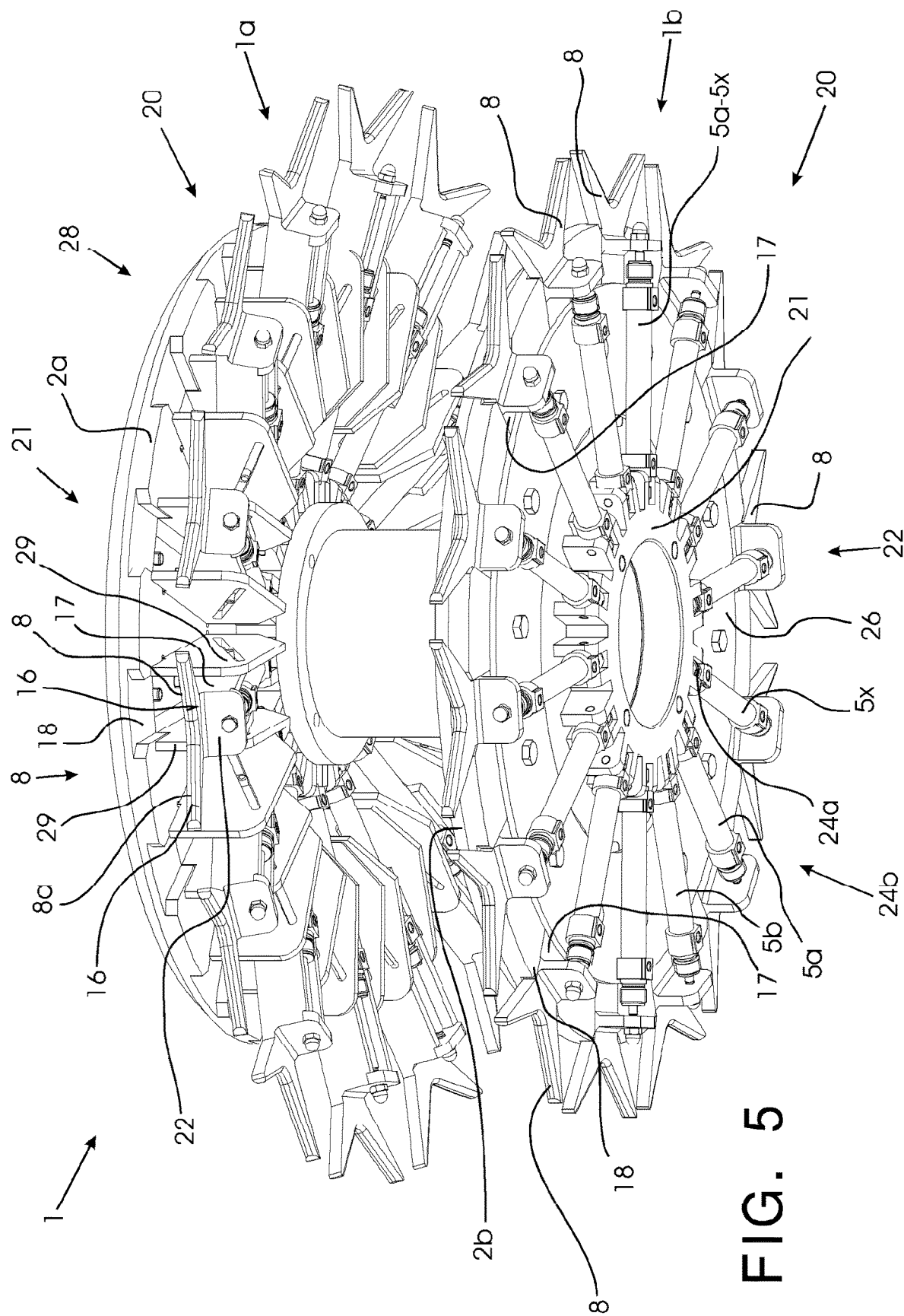
FIG. 5 shows schematically, in a perspective representation, the underside of the transport star-wheel from FIG. 4.

FIG. 5 shows schematically in a perspective representation a section of an alternative exemplification of a transport star-wheel 1, with two transport star-wheel planes 1a, 1b. The upper transport star-wheel plane 1b comprises a simplified adjustment device, with star-wheel pockets 8 mounted such that they are movable exclusively in the radial direction A. A movement of the star-wheel pockets 8, arranged on the lower star-wheel 2b, in the vertical direction E is not provided for. Accordingly, the linear units 5a-5x, likewise aligned in the radial direction A, on the lower star-wheel 2a, with their first ends 24a in the central receiver 21, are not mounted such as to pivot, nor are any guide elements 29 assigned. For this purpose, arranged on each star-wheel 8 is a guide body 17, aligned parallel to or essentially parallel to the star-wheel plane 1b, configured as a slide body, which forms, together with a guide body receiver 18 formed as a cut-out aperture in the star-wheel 2a, a guide device 19 for the radial guiding of the star-wheel pockets 8. The guide body 17 is held in the guide body receiver 18 by a positioning body 26. The guide body receivers 18 are aligned in the radial direction A.

Figure 5A:
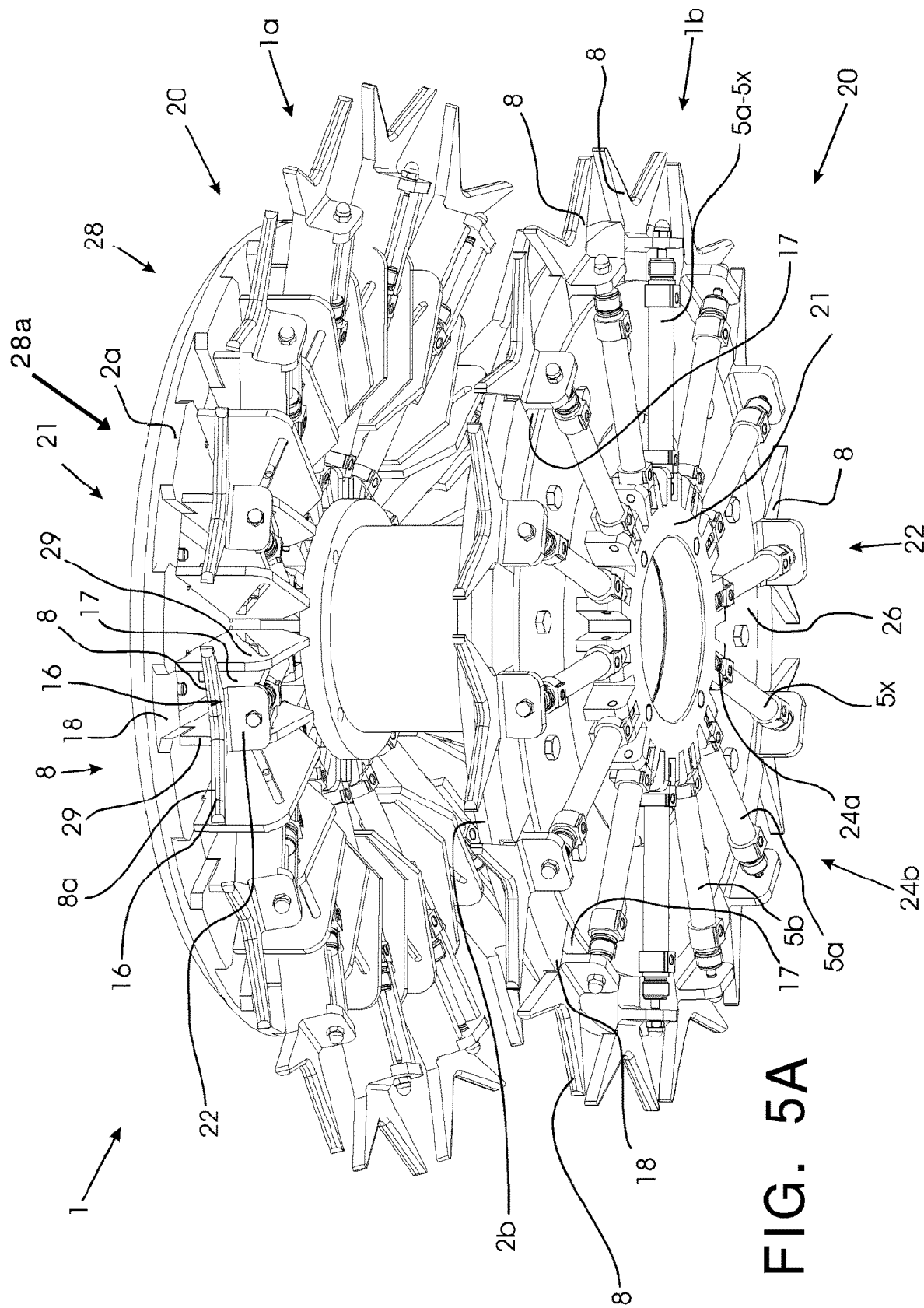
FIG. 5A shows schematically, in a perspective representation, the underside of the transport star-wheel from FIG. 4, showing further labeling of the general alignment of a guide unit.

FIG. 5a shows schematically in a perspective representation a section of an alternative exemplification of a transport star-wheel 1, with two transport star-wheel planes 1a and 1b, as shown in FIG. 5. The guide unit 28a is shown aligned generally with a linear unit.

By their second ends 24b, opposite the first end 24a, the linear units 5a-5x are likewise connected to the star-wheel pocket 8 by means of a coupling unit 22. The coupling unit 22 is configured such as to correspond to the coupling units 22 from FIGS. 2-4.

Corresponding to the description for FIG. 4, the actuation of the linear units 5a-5x of each star-wheel 2a, 2b, can likewise take place independently of one another, for example by means of separate drive units 10.

Figure 6:
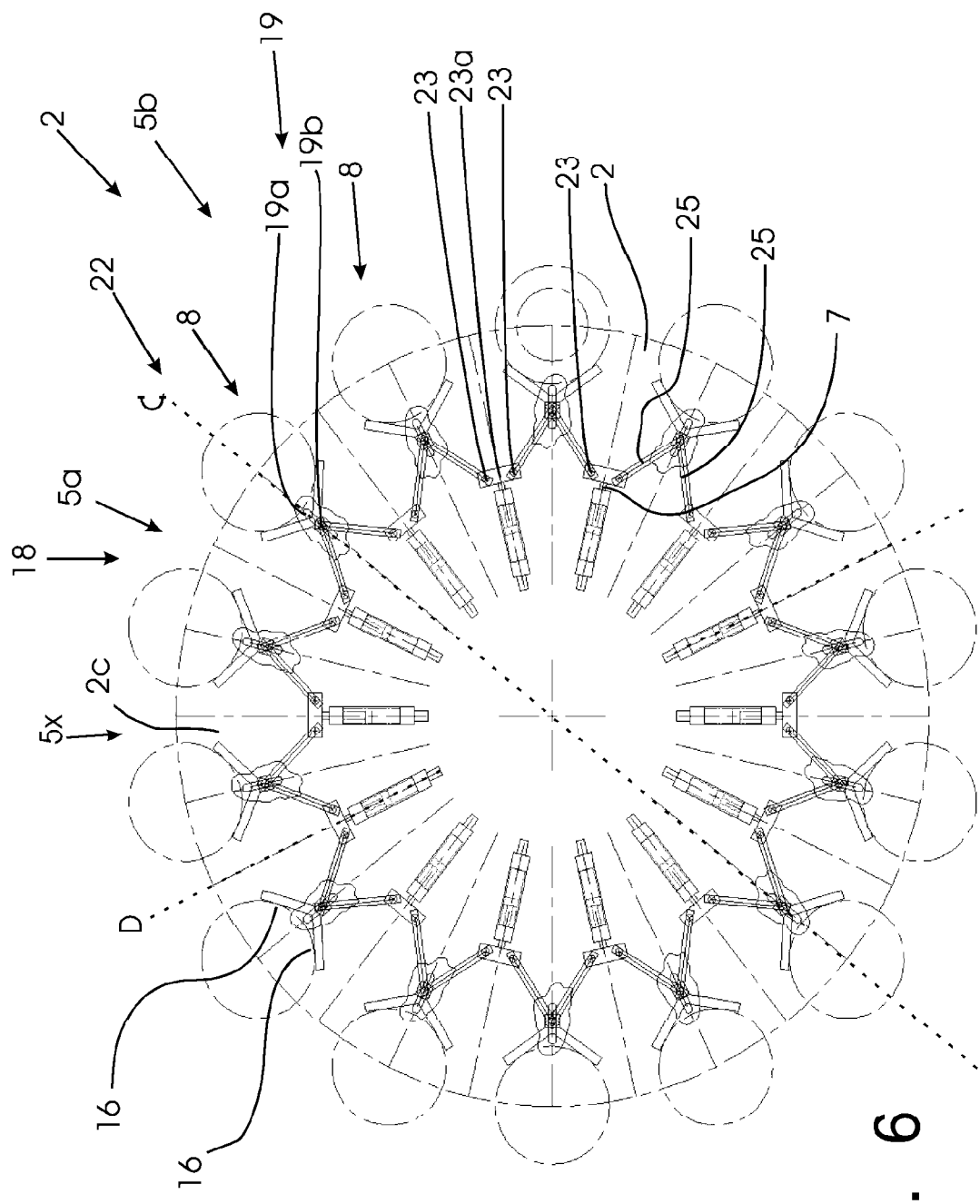
FIG. 6 shows schematically, in one view, a section of a further exemplification of a transport star-wheel, with an alternative coupling unit.

FIG. 6 shows schematically in one view an underside of a star-wheel 2, with an alternative exemplification of a coupling unit 22 with coupling arms 25. In this situation, however, the middle axes D of the linear units 5a-5x are offset radially to the middle axes C of the star-wheel pockets 8, likewise arranged in the radial direction A. Between the middle axis D of the linear units 5a-5x and the middle axes C of the star-wheel pockets 8 is an angle $\alpha \neq 0°$.

The star-wheel pockets 8 exhibit in each case contact regions 16 and a guide device 19, configured as a link guide. In order to allow for an exclusively radial movement of the star-wheel pockets, corresponding to the lower star-wheel 2b described in FIG. 5, the guide device 19 can comprise, in a base body 2c of the star-wheel 2, a link bolt receiver 19a, formed as a slot-type guide body receiver 18, in which a link bolt 19b, formed as a guide body 17, is mounted such as to be movable in the radial direction A. Each link bolt 19b is in turn connected to two coupling arms 25, arranged such as to rotate at the link bolt 19b. The coupling arms 25 are in each case coupled by their ends opposite the link bolt 19b, by means of a rotation bearing 23 at a coupling arm receiver 23a, to the second end 24b of a piston 7a-7x of one of the linear units 5a-5x.

Allocated for each star-wheel pocket 8 is in each case one linear unit 5a-5x. The ratio of the number of star-wheel pockets 8 and the number of linear units 5a-5x therefore amounts to 1:1.

By means of the coupling unit 22, formed from the coupling arms 25, the respective rotation bearings 23, and the rotatable connection to the link bolt 19a, virtually all of the linear units 5a-5x are coupled, at least indirectly, to virtually all of the star-wheel pockets 8. This exemplification allows for a relatively stable positioning of the star-wheel pockets 8 in a predetermined position. The counter-pressure, which is imposed in operation onto one or more star-wheel pockets 8, is transferred by means of the coupling unit 22 onto virtually all of the linear units 5a-5x, as a result of which the position stability of the star-wheel pockets 8 is generally sufficient.

Figure 7:
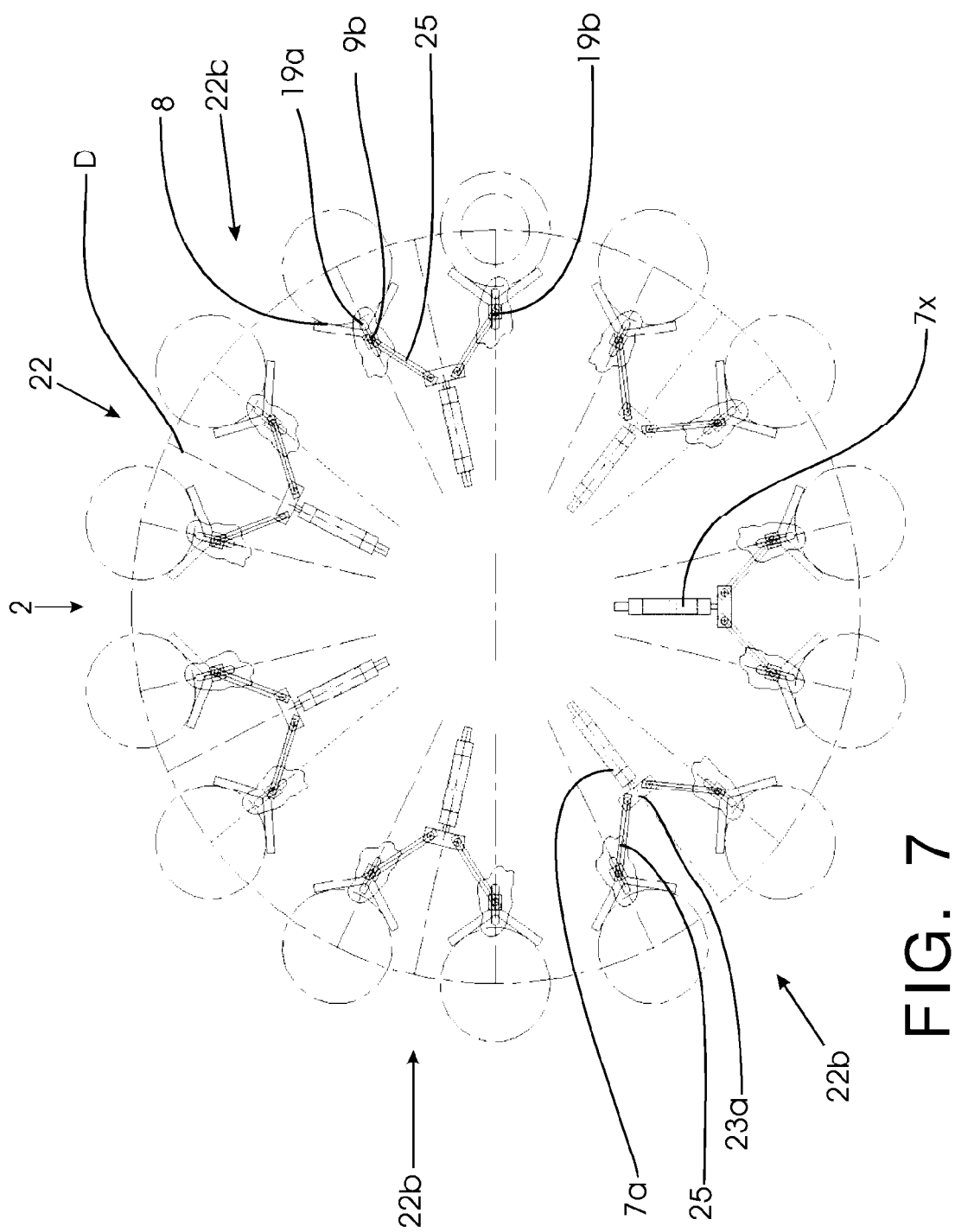
FIG. 7 shows schematically, in one view, a further exemplification of a star-wheel with an alternative exemplification of the coupling unit.

FIG. 7 shows schematically in one view a further exemplification of the star-wheel 2, with a coupling unit 22. The coupling unit 22 comprises of a plurality of part couplings 22b, which in each case connect two star-wheel pockets 8 to a linear unit 5a-5x. In this situation, the coupling unit 22 corresponds very largely to the exemplification from FIG. 6, but in each case generally only one coupling arm 25 is rotatably arranged at each link bolt 19b, such that in each case two star-wheel pockets 8 are driven by one of the linear units 5a-5x. This exemplification is, in one possible exemplification of the present application, desired since the ratio of star-wheel pockets 8 to the number of linear units 5a-5x is 2:1, as a result of which, in one possible exemplification of the present application, a generally low and easily controllable number of linear units 5a-5x are arranged for the radial moving of the star-wheel pockets 8.

A further alternative exemplification can be achieved by way of a combination of the exemplifications represented in FIG. 6 and FIG. 7. For this purpose, two coupling arms 25 engage in each link bolt 19b, wherein in each case one of the coupling arms 25 is connected to a coupling arm 25 of the link bolt 19b arranged at the adjacent star-wheel pocket. This connection can, if appropriate, in order to generally improve the guidance, also comprise an additional guide device 19, with link bolt 19b and link bolt receiver 19a, in the region of the free ends of the coupling arms 25. This exemplification, which is not represented, corresponding to the exemplification from FIG. 7 exhibits the ratio of 2:1 between the number of star-wheel pockets 8 and the number of linear units, and, corresponding to the exemplification from FIG. 6, comprises a coupling unit 22, which connects virtually all of the star-wheel pockets 8 with virtually all of the linear units 5a-5x.

In order to allow, with the exemplification according to FIG. 6 and FIG. 7, both a radial as well as a vertical movement of the star-wheel pockets 8, the guide device 19 comprises instead of a link bolt receiver 19a a guide element 29 (not represented here), which is arranged, for example, perpendicular to or substantially perpendicular to the star-wheel 2, with a guide curve 30, wherein the link bolt 19b can be configured as a follower 27 (not represented here). The coupling arm 25 or the coupling arms 25 can engage at the follower 27.

The star-wheel pockets 8 of virtually all of the exemplifications from FIGS. 1-7 comprise two star-wheel pocket arms 8a, arranged rigidly in relation to one another, and are therefore configured in a v-shape (fork type). In this situation each star-wheel pocket arm 8a comprises arranged on the outside a contact section 16 for one of the containers 9.

The linear units 5a-5x of virtually all of the exemplifications from FIGS. 1-7 are represented as piston-cylinder units. These are driven here by means of a liquid fluid (hydraulic fluid). Alternative drive devices can of course also be used, such as, for example, pneumatically and/or electrically driven piston-cylinder units. As an alternative, the linear units represented in FIGS. 1-7 can also be configured as electrically driven linear units, for example as spindle drives, toothed wheel drives, servomotors, and/or as electrical linear motors.

Figure 8:
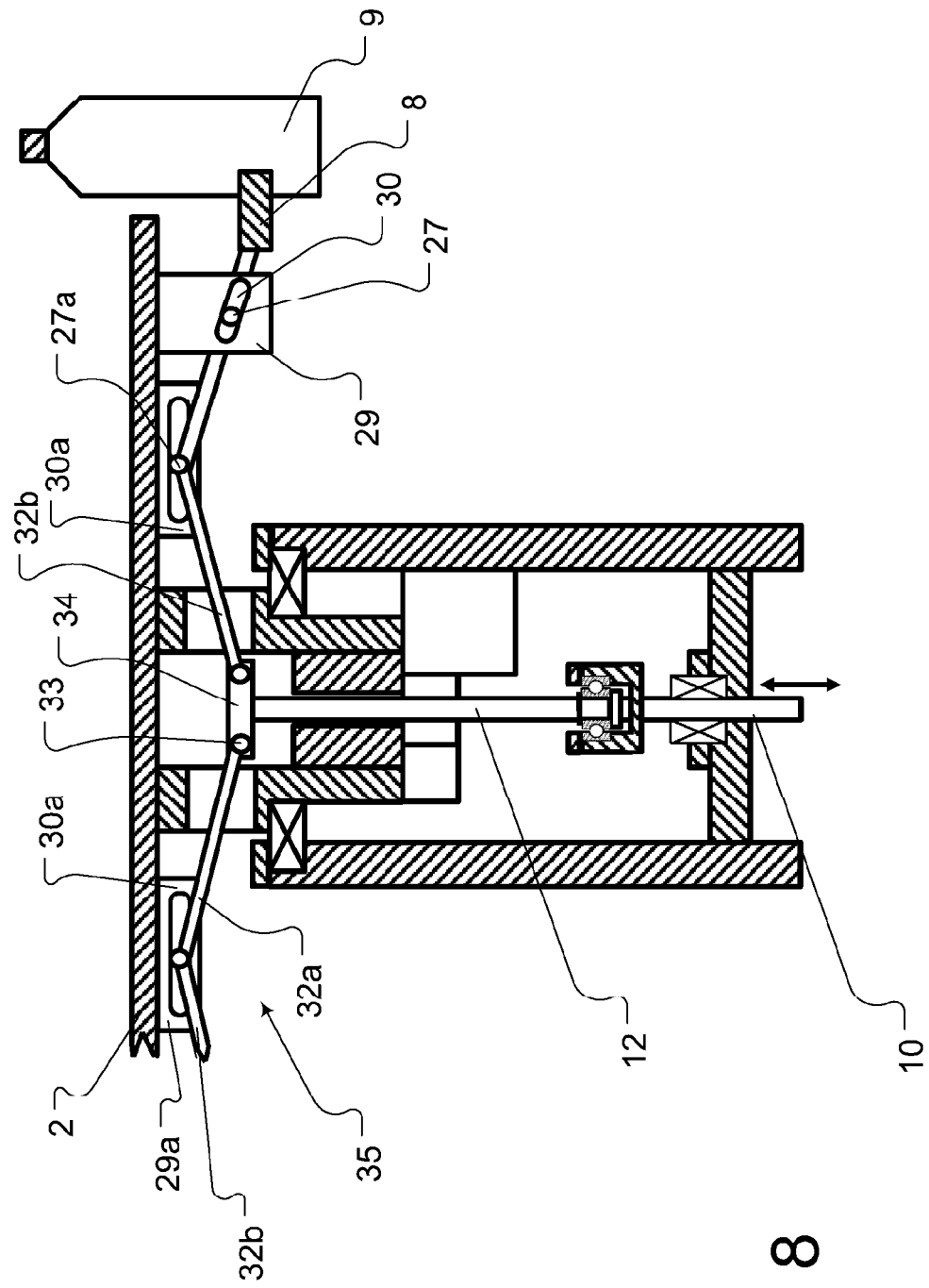
FIG. 8 shows schematically, in a vertical sectional drawing, a transport star-wheel with a central mechanical drive for the star-wheel pockets.

FIG. 8 shows an alternative exemplification, with which the basic design corresponds to that of FIG. 1. In this case, the vertically movable drive unit 10 and the coupled distributor unit 12, which comprises a head element 34 at its upper end, drives centrally a plurality of lever arms 35. The lever arms 35 are mounted on the head element 34 by a first joint 33, and comprise a first guide rod 32*a*, which is connected by means of a follower 27*a* in jointed fashion to a second guide rod 32*b*. In this situation, the follower 27*a* is guided in a guide curve 30*a*, which is arranged in a guide element 29*a* secured to the star-wheel 2. In the exemplification shown in FIG. 8, the two guide curves 30 and 30*a* are configured as longitudinal holes, which exhibit no incline, or generally only one single incline. The guide curves could, however, both or generally only one of them, in one possible exemplification, exhibit a bow-shaped or curved course, in one possible exemplification of the present application, a curve course, of which the radial inner end lies above the radial outer curve end.

The guide rods 32*b* carry at their radial outer free end in each case a star-wheel pocket 8, or are configured as one such. In this situation the second guide rod 32*b* is guided in an analogous manner or mounted on bearings, as described for the guide body 17 from FIG. 5.

In addition, in an analogous manner to the exemplification from FIG. 6, coupling arms 25 can be provided for, in order, with a lever arm 35, to move two star-wheel pockets 8 radially and in height.

The adjustment device 20 can also comprise a central adjustment arrangement (not represented), connected to the linear units 5*a*-5*x* and the drive device 10, which, in accordance with the foregoing explanations, is configured as a mechanical central adjustment arrangement, for example as a rod or mechanically movable piston-cylinder unit. Adapted to this configuration, the linear units 5*a*-5*x* represented in FIGS. 1-7 can likewise be configured as mechanically adjustable rods, guide devices, link guides, and/or as mechanically adjustable piston-cylinder units, which are coupled to the central adjustment arrangement.

The present application relates to a transport star-wheel for guiding containers in a container handling facility. In order to provide an adjustable transport star-wheel for guiding containers having different dimensions, which is cost-effective, easy to adjust and easy to clean, a star-wheel 2 having a plurality of star-wheel pockets 8 for arranging each of the containers is provided, as well as an adjustment device 20 having a plurality of linear units 5*a*-5*x* for moving said star-wheel pockets, a coupling unit 22 connecting said linear units and said star-wheel pockets, and a guide unit for guiding said star-wheel pockets in a radial and a vertical direction.

One feature or aspect of an exemplification is believed at the time of the filing of this patent application to possibly reside broadly in a transport star-wheel for guiding containers in a container handling facility, comprising:
a star-wheel 2, with a plurality of star-wheel pockets 8 for accommodating in each case a container 9, and
an adjustment device 20 with a plurality of linear units 5*a*-5*x* arranged in a radial direction, for moving said star-wheel pockets 8, a coupling unit 22 connecting said linear units 5*a*-5*x* and said star-wheel pockets 8, and a guide unit 28 for guiding said star-wheel pockets 8 in a radial and a vertical direction.

Another feature or aspect of an exemplification is believed at the time of the filing of this patent application to possibly reside broadly in a transport star-wheel wherein said linear units 5*a*-5*x* are configured as hydraulic linear units 5*a*-5*x*.

Yet another feature or aspect of an exemplification is believed at the time of the filing of this patent application to possibly reside broadly in a transport star-wheel wherein said linear units 5*a*-5*x* are mounted such as to pivot by a first end 24*a*.

Still another feature or aspect of an exemplification is believed at the time of the filing of this patent application to possibly reside broadly in a transport star-wheel wherein said guide unit 28 comprises a follower 27 arranged in a guide curve 30 and coupled to one of said star-wheel pockets 8.

A further feature or aspect of an exemplification is believed at the time of the filing of this patent application to possibly reside broadly in a transport star-wheel wherein said guide curve 30 is mounted such as to pivot.

Another feature or aspect of an exemplification is believed at the time of the filing of this patent application to possibly reside broadly in a transport star-wheel wherein said adjustment device 20 is configured such as to move each star-wheel pocket 8 of a star-wheel 2 simultaneously, one after another, or alternating, in a radial direction and a vertical direction.

Yet another feature or aspect of an exemplification is believed at the time of the filing of this patent application to possibly reside broadly in a transport star-wheel wherein said star-wheel pockets 8 comprise two star-wheel pocket arms 8*a*, arranged rigidly in relation to one another when said transport star-wheel 1 is in operation, for contact with one of said containers 9, wherein said star-wheel pockets arms 8*a*, with said transport star-wheel 1 in operation, do not carry out any clamping or gripping movement for taking up one of said containers 9.

Still another feature or aspect of an exemplification is believed at the time of the filing of this patent application to possibly reside broadly in a transport star-wheel wherein said adjustment device 20 comprises a drive unit 10 coupled to said linear unit 5*a*-5*x* and configured to drive said linear unit 5*a*-5*x*.

A further feature or aspect of an exemplification is believed at the time of the filing of this patent application to possibly reside broadly in a transport star-wheel wherein said linear units 5*a*-5*x* or groups of said linear units 5*a*-5*x* are coupled in series one after another.

Another feature or aspect of an exemplification is believed at the time of the filing of this patent application to possibly reside broadly in a transport star-wheel wherein said adjustment device 20 comprises a distributor unit 12 coupled to said drive unit 10 and said linear units 5*a*-5*x*.

Yet another feature or aspect of an exemplification is believed at the time of the filing of this patent application to possibly reside broadly in a transport star-wheel wherein said distributor unit 12 is a hydromechanical synchronizing device, by means of which a controlled distribution of a hydraulic fluid is put into effect, and synchronous operation of said hydraulic linear units 5*a*-5*x* is attained.

Still another feature or aspect of an exemplification is believed at the time of the filing of this patent application to possibly reside broadly in a transport star-wheel wherein said drive unit 10 is a structural body of the container handling facility which does not rotate during the rotating operation of said star-wheel 2.

A further feature or aspect of an exemplification is believed at the time of the filing of this patent application to possibly reside broadly in a transport star-wheel wherein between said drive unit 10 and said distributor unit 12 a coupling is arranged, in one possible exemplification, a mechanical coupling 11, for transferring the drive force from said drive unit 10 onto said distributor unit 12.

Another feature or aspect of an exemplification is believed at the time of the filing of this patent application to possibly reside broadly in a transport star-wheel wherein a sensor is arranged in order to determine the position of star-wheel pockets 8.

Yet another feature or aspect of an exemplification is believed at the time of the filing of this patent application to possibly reside broadly in a transport star-wheel wherein said transport star-wheel 1 comprises an upper and a lower star-wheel 2a, 2b, wherein at least one of said two star-wheels 2a, 2b comprises star-wheel pockets 8 which are adjustable vertically and radially.

One feature or aspect of an exemplification is believed at the time of the filing of this patent application to possibly reside broadly in a transport star-wheel arrangement configured to guide containers in a container handling facility, said transport star-wheel arrangement comprising: a star-wheel, with a plurality of star-wheel pockets, each pocket configured to accommodate a container, and an adjustment arrangement comprising a plurality of linear devices arranged in a radial direction from a star wheel axis of rotation; said linear devices operatively connected to move said star-wheel pockets; a coupling device connecting each said linear device to corresponding star-wheel pocket or pockets; said coupling devices configured to permit movement of said linear devices to transmit movement to said star wheel pockets; a guide device connected to at least one of said coupling devices; and each said guide device being configured to guide at least one of said star-wheel pockets in both the radial direction and a vertical direction.

Another feature or aspect of an exemplification is believed at the time of the filing of this patent application to possibly reside broadly in a transport star-wheel arrangement wherein said linear devices comprise hydraulic linear devices.

Yet another feature or aspect of an exemplification is believed at the time of the filing of this patent application to possibly reside broadly in a transport star-wheel wherein said linear devices are mounted to pivot at an end thereof.

Still another feature or aspect of an exemplification is believed at the time of the filing of this patent application to possibly reside broadly in a transport star-wheel arrangement wherein each said guide device comprises a guide curve arrangement configured to guide a container, which container is held in its corresponding one of said star-wheel pockets; each said guide curve arrangement being coupled to at least one of said star-wheel pockets; and a follower configured and disposed to move along said guide curve arrangement.

A further feature or aspect of an exemplification is believed at the time of the filing of this patent application to possibly reside broadly in a transport star-wheel arrangement wherein each said guide device comprises a guide curve arrangement configured to guide a container, which container is held in its corresponding one of said star-wheel pockets; each said guide curve arrangement being coupled to at least one of said star-wheel pockets; and a follower configured and disposed to move along said guide curve arrangement.

Another feature or aspect of an exemplification is believed at the time of the filing of this patent application to possibly reside broadly in a transport star-wheel wherein said guide curve arrangement of said guide device is mounted to pivot and thus permit pivoting of said guide curve arrangement.

Yet another feature or aspect of an exemplification is believed at the time of the filing of this patent application to possibly reside broadly in a transport star-wheel arrangement wherein said adjustment arrangement is configured to move, radially and vertically, each star-wheel pocket of a star-wheel simultaneously, or one after another, or alternately.

Still another feature or aspect of an exemplification is believed at the time of the filing of this patent application to possibly reside broadly in a transport star-wheel arrangement wherein each said guide device comprises a guide curve arrangement configured to guide a container, which container is held in its corresponding one of said star-wheel pockets; each said guide curve arrangement being coupled to at least one of said star-wheel pockets; and a follower configured and disposed to move along said guide curve arrangement.

A further feature or aspect of an exemplification is believed at the time of the filing of this patent application to possibly reside broadly in a transport star-wheel arrangement wherein each said guide device comprises a guide curve arrangement configured to guide a container, which container is held in its corresponding one of said star-wheel pockets; each said guide curve arrangement being coupled to at least one of said star-wheel pockets; and a follower configured and disposed to move along said guide curve arrangement.

Another feature or aspect of an exemplification is believed at the time of the filing of this patent application to possibly reside broadly in a transport star-wheel wherein said guide curve arrangement of said guide device is mounted to pivot and thus permit pivoting of said guide curve arrangement.

Yet another feature or aspect of an exemplification is believed at the time of the filing of this patent application to possibly reside broadly in a transport star-wheel arrangement wherein said adjustment arrangement is configured to move, radially and vertically, each star-wheel pocket of a star-wheel simultaneously, or one after another, or alternately.

Still another feature or aspect of an exemplification is believed at the time of the filing of this patent application to possibly reside broadly in a transport star-wheel arrangement wherein said adjustment arrangement is configured to move, radially and vertically, each star-wheel pocket of a star-wheel simultaneously, or one after another, or alternately.

A further feature or aspect of an exemplification is believed at the time of the filing of this patent application to possibly reside broadly in a transport star-wheel arrangement wherein said star-wheel pockets comprise two star-wheel pocket arms, arranged in a fixed position in relation to one another, each of said two star-wheel pocket arms of one star-wheel being configured to make contact with a sole container; said star-wheel pockets arms are configured not to provide a movement to clamp or grip a container at a time of a receipt of a container.

Another feature or aspect of an exemplification is believed at the time of the filing of this patent application to possibly reside broadly in a transport star-wheel wherein said guide curve arrangement of each said guide device is mounted to pivot and thus permit pivoting of said guide curve arrangement.

Yet another feature or aspect of an exemplification is believed at the time of the filing of this patent application to possibly reside broadly in a transport star-wheel arrangement wherein said adjustment arrangement comprises a drive arrangement coupled to said linear devices and configured to drive said linear devices.

Still another feature or aspect of an exemplification is believed at the time of the filing of this patent application to possibly reside broadly in a transport star-wheel arrangement wherein said linear devices or groups of said linear devices are coupled in series one after another such that one linear device or one of said groups of said linear devices is/are configured to activate a following linear device or a following group of linear devices in a series of said linear devices.

A further feature or aspect of an exemplification is believed at the time of the filing of this patent application to possibly reside broadly in a transport star-wheel arrangement wherein said adjustment arrangement comprises a distributor arrangement coupled to said drive arrangement and said linear devices.

Another feature or aspect of an exemplification is believed at the time of the filing of this patent application to possibly reside broadly in a transport star-wheel arrangement wherein said distributor arrangement is a hydromechanical synchronizing device, by means of which a controlled distribution of a hydraulic fluid is put into operation to provide substantially synchronous operation of said hydraulic linear devices.

Yet another feature or aspect of an exemplification is believed at the time of the filing of this patent application to possibly reside broadly in a transport star-wheel arrangement wherein said drive arrangement is stationarily connected directly to a stationary portion of said container handling facility and said drive arrangement is not rotatable during rotatable operation of said star-wheel.

Still another feature or aspect of an exemplification is believed at the time of the filing of this patent application to possibly reside broadly in a transport star-wheel arrangement wherein between said drive arrangement and said distributor arrangement a coupling is disposed, such as a mechanical coupling configured to transfer a drive force from said drive arrangement to said distributor arrangement.

A further feature or aspect of an exemplification is believed at the time of the filing of this patent application to possibly reside broadly in a transport star-wheel wherein a sensor is disposed and configured to determine positions of said star-wheel pockets.

Another feature or aspect of an exemplification is believed at the time of the filing of this patent application to possibly reside broadly in a transport star-wheel wherein said transport star-wheel arrangement comprises an upper star-wheel and a lower star-wheel, wherein at least one of said two star-wheels comprises star-wheel pockets being adjustable vertically and radially.

Yet another feature or aspect of an exemplification is believed at the time of the filing of this patent application to possibly reside broadly in a transport arrangement configured to guide containers in a container handling facility, said transport arrangement comprising: a plurality of container receiving pockets, each container receiving pocket being configured to accommodate a container, an adjustment arrangement comprising a plurality of mechanical, transporting arrangements disposed substantially adjacent to said container receiving pockets and being configured and disposed to provide movement to said container receiving pockets; coupling devices connecting said mechanical, transporting arrangement and said container receiving pockets; said coupling devices configured and disposed to permit movements of said mechanical, transporting arrangements to transmit movements to said container receiving pockets; guide devices operatively connected to said mechanical, transporting arrangements; and said guide devices being configured to guide said container receiving pockets in both a horizontal direction and a vertical direction.

Still another feature or aspect of an exemplification is believed at the time of the filing of this patent application to possibly reside broadly in a transport arrangement configured to guide containers in a container handling facility, said transport arrangement comprising: a plurality of container receiving arrangements, each container receiving arrangement being configured to accommodate a container, an adjustment arrangement comprising a plurality of transporting arrangements disposed substantially adjacent to said container receiving arrangements and being configured and disposed to provide movement to said container receiving arrangements; coupling devices connecting said transporting arrangements and said container receiving arrangements; said coupling devices being configured and disposed to permit movements of said transporting arrangements to transmit movements to said container receiving arrangements; guide devices operatively connected to said transporting arrangements; and said guide devices configured to guide said container receiving arrangements in both a horizontal direction and a vertical direction.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

All of the patents, patent applications, patent publications, and other documents, except for the exceptions indicated herein, which were cited in the International Search Report dated Apr. 21, 2017, and/or cited elsewhere, as well as the International Search Report document itself, are hereby incorporated by reference as if set forth in their entirety herein except for the exceptions indicated herein, as follows: DE 10 2013 105431 A1, having the German title "Formatteil zum Führen von Behältern in einer Behälterbehandlungsanlage", published on Nov. 27, 2014; DE 10 2013 106084 A1, having the German title "Behältertransportvorrichtung", published on Dec. 18, 2014; DE 10 2011 010954 A1, having the English translation of the German title "Transport apparatus e.g. discharge star wheel, for use in e.g. filler for transportation of container, has holding devices for holding and transporting bottles or containers, and body viewed along radial direction and elastically flexible", published Aug. 16, 2012; DE 14 82 616 A1, having the German title "Vorrichtung zum mittigen Festhalten von Flaschen verschiedenen Durchmessers in Fuell-, Verschliess- and dergleichen Maschinen", published on Jan. 9, 1969; and GB 2 075 943 A, having the title "Method For Indexing Containers and Feed Mechanism For Carrying Out the Method", published on Nov. 25, 1981.

All of the patents, patent applications, patent publications, and other documents, except for the exceptions indicated herein, which were cited in the German Office Action dated May 25 2016, and/or cited elsewhere, as well as the German Office Action document itself, are hereby incorporated by reference as if set forth in their entirety herein except for the exceptions indicated herein, as follows: DE 100 1243 50 084 A1, having the English translation of the German title "Adjustable conveyor star for bottles etc. has device with first and second arms forming cells to engage around bottles", published on Aug. 30, 2001; DE 103 52 885 A1, having the English translation of the German title "Device for supplying and discharging containers", published on Jul. 7, 2005; DE 10 2013 106084 A1, having the German title "Behältertransportvorrichtung", published on Dec. 18, 2014; DE 30 40 096 A1, having the English translation of the German title "Revolving star for handling bottles—has cushioned seatings with flexible gripper edges easily deformed by actuators", published on May 27, 1982; DE 10 2013 105431 A1, having the German title "Formatteil zum Führen von Behältern in einer Behälterbehandlungsanlage", published on Nov. 27, 2014; and DE 10 2012 106 263 A1, having the English translation of the German title "Apparatus for guiding containers", published Jan. 16, 2014.

The corresponding foreign and international patent publication applications, namely, Federal Republic of Germany Patent Application No. DE 10 2016 101 985.2, filed on Feb. 4, 2016, having inventors Matthias SCHOPP and Alberto GARCIA, and DE-OS 10 2016 101 985.2 and DE-PS 10 2016 101 985.2, and International Application No. PCT/EP2017/052340, filed on Feb. 3, 2017, having WIPO Publication No. WO2017/134201 and inventors Matthias SCHOPP and Alberto GARCIA, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent applications, that is, PCT/EP2017/052340 and German Patent Application No. DE 10 2016 101 985.2, is solely for the purposes of providing a basis of correction of any wording in the pages of the present application, which may have been mistranslated or misinterpreted by the translator, and to provide additional information relating to technical features of one or more exemplifications, which information may not be completely disclosed in the wording in the pages of this application.

Statements made in the original foreign patent applications PCT/EP2017/052340 and DE 10 2016 101 985.2 from which this patent application claims priority which do not have to do with the correction of the translation in this patent application are not to be included in this patent application in the incorporation by reference.

Any statements about admissions of prior art in the original foreign patent applications PCT/EP2017/052340 and DE 10 2016 101 1295 985.2 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

While various aspects and exemplifications have been disclosed herein, other aspects and exemplifications are contemplated. The various aspects and exemplifications disclosed herein are for purposes of illustration and not intended to be limiting. Additionally, the words "including," "having," and variants thereof (e.g., "includes" and "has") as used herein, including the claims, shall be open-ended and have the same meaning as the word "comprising" and variants thereof (e.g., "comprise" and "comprises").

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

LIST OF AT LEAST PARTIAL
NOMENCLATURE

1 Transport star-wheel
1A, 1B Transport star-wheel planes
2 Star-wheel
2A Upper star-wheel
2B Lower star-wheel
2C Basic body of star-wheel
3 Rotation bearing for star-wheel
4 Star-wheel receiver
5A-5X Linear units
6A-6X Cylinders
7A-7X Pistons
8 Star-wheel pocket
8A, 8B Star-wheel pocket arms
9 Container
10 Drive unit
11 Mechanical coupling
12 Distributor unit
13 Hydraulic fluid line
14 Connection line for hydraulic fluid
15 Return line for hydraulic fluid
16 Contact regions
17 Guide body
17A Outer end of guide body
18 Guide body receiver
19 Guide device
19A Link bolt receiver
19B Link bolt
20 Adjustment device
21 Central receiver
22 Coupling unit
22A Support element
22B Part coupling unit 23 Rotation bearing
23A Coupling arm receiver
24A First end of linear unit
24B Second end of linear unit
24C Screw connection
25 Coupling arm
26 Positioning body
27, 27A Follower
28, 28A Guide unit
29, 29A Guide element
30, 30A Guide curve
31 Axis
32A, 32B Guide rod
33 Joint
34 Head element
35 Lever arm
A Radial direction
B Rotation axis of star-wheel
C Middle axis of star-wheel pocket
D Middle axis of linear unit
E Vertical direction

What is claimed is:

1. A transport star-wheel arrangement to guide containers in a container handling facility, said transport star-wheel arrangement comprising:
a star-wheel comprising a plurality of star-wheel pockets, each pocket being configured to accommodate a container;
an adjustment arrangement comprising a plurality of linear devices arranged in a radial direction with respect to a vertical star wheel axis of rotation of said star-wheel;
said linear devices being operatively connected to move said star-wheel pockets;
a coupling device connecting each said linear device to corresponding star-wheel pocket or pockets;
said coupling devices being configured to permit movement of said linear devices to transmit movement to said star-wheel pockets;
a guide device being connected to at least one of said coupling devices;
each said guide device being configured to guide at least one of said star-wheel pockets in both the radial direction and a vertical direction;
wherein each said guide device comprises a guide surface arrangement configured to a guide container, which container is held in its corresponding one of said star-wheel pockets;
each said surface arrangement being coupled to at least one of said star-wheel pockets; and
a follower configured and disposed to move along said guide surface arrangement.

2. Transport star-wheel arrangement according to claim 1, wherein said linear devices comprise hydraulic linear devices.

3. Transport star-wheel according to claim 2, wherein said linear devices are mounted to pivot at an end thereof.

4. Transport star-wheel according to claim 2, wherein said guide surface arrangement of said guide device is mounted to pivot and thus permit pivoting of said guide surface arrangement.

5. Transport star-wheel arrangement according to claim 4, wherein said adjustment arrangement is configured to move radially and vertically, each star-wheel pocket of a star-wheel simultaneously, or one after another, or alternately.

6. Transport star-wheel arrangement according to claim 5, wherein said star-wheel pockets comprise two star-wheel pocket arms, arranged in a fixed position in relation to one another;
each of said two star-wheel pocket arms of one star-wheel being configured to make contact with a sole container;
said star-wheel pocket arms are configured not to provide a movement to clamp or grip a container at a time of receipt of a container.

7. Transport star-wheel according to claim 6, wherein said guide surface arrangement of each said guide device is mounted to pivot and thus permit pivoting of said guide surface arrangement.

8. Transport star-wheel arrangement according to claim 6, wherein said adjustment arrangement comprises a drive arrangement coupled to said linear devices and configured to drive said linear devices.

9. Transport star-wheel arrangement according to claim 8, wherein said linear devices or groups of said linear devices are coupled in series one after another such that one linear device or one of said groups of said linear devices is/are configured to activate a following linear device or a following group of linear devices in a series of said linear devices.

10. Transport star-wheel arrangement according to claim 9, wherein said adjustment arrangement comprises a distributor arrangement coupled to said drive arrangement and said linear devices.

11. Transport star-wheel arrangement according to claim 10, wherein said distributor arrangement is a hydromechanical synchronizing device, by means of which a controlled distribution of a hydraulic fluid is put into operation to provide substantially synchronous operation of said hydraulic linear devices.

12. Transport star-wheel arrangement according to claim 11, wherein said drive arrangement is stationarily connected directly to a stationary portion of said container handling facility and said drive arrangement is not rotatable during rotatable operation of said star-wheel.

13. Transport star-wheel arrangement according to claim 12, wherein between said drive arrangement and said distributor arrangement a coupling is disposed, such as a mechanical coupling configured to transfer a drive force from said drive arrangement to said distributor arrangement.

14. Transport star-wheel according to claim 13, wherein a sensor is disposed and configured to determine positions of said star-wheel pockets.

15. Transport star-wheel according to claim 14, wherein said transport star-wheel arrangement comprises an upper star-wheel and a lower star-wheel, wherein at least one of said two star-wheels comprises star-wheel pockets being adjustable vertically and radially.

16. Transport star-wheel arrangement according to claim 1, wherein said adjustment arrangement is configured to move, radially and vertically, each star-wheel pocket of a star-wheel simultaneously, or one after another, or alternately.

* * * * *